United States Patent
Shibata

(10) Patent No.: US 7,924,511 B2
(45) Date of Patent: Apr. 12, 2011

(54) OPTICAL SYSTEM, METHOD FOR FOCUSING, AND IMAGING APPARATUS EQUIPPED THEREWITH

(75) Inventor: Satoru Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/393,035

(22) Filed: Feb. 25, 2009

(65) Prior Publication Data
US 2009/0244724 A1    Oct. 1, 2009

(30) Foreign Application Priority Data

Mar. 31, 2008  (JP) ................. 2008-092663
Mar. 31, 2008  (JP) ................. 2008-092670
Mar. 31, 2008  (JP) ................. 2008-092682

(51) Int. Cl.
*G02B 9/12*   (2006.01)
*G02B 9/06*   (2006.01)

(52) U.S. Cl. ......................... 359/792; 359/794

(58) Field of Classification Search .............. 359/784, 359/787, 792, 794, 793, 684, 691
See application file for complete search history.

(56) References Cited

U.S. PATENT DOCUMENTS

| 4,508,434 A | 4/1985 | Ogawa |
| 4,812,027 A | 3/1989 | Yanagisawa |
| 5,172,274 A | 12/1992 | Hirakawa |
| 5,640,277 A | 6/1997 | Ohshita |
| 2009/0086340 A1* | 4/2009 | Sato ........................... 359/794 |

FOREIGN PATENT DOCUMENTS

| JP | 3-200909 A | 9/1991 |
| JP | 7-199066 A | 8/1995 |

OTHER PUBLICATIONS

Extended European Search Report and Search Opinion from European Patent Appln. No. 09250517.

* cited by examiner

*Primary Examiner* — Alicia M Harrington
(74) *Attorney, Agent, or Firm* — Miles & Stockbridge P.C.

(57) ABSTRACT

Providing an optical system having excellent optical performance over entire focusing range from infinity to a close distance, a method for focusing the optical system, and an imaging apparatus equipped therewith. The optical system includes, in order from an object, a first lens group G1 having positive refractive power, and a second lens group G2 having positive refractive power. The second lens group G2 is movable along an optical axis for varying focusing. The first lens group G1 satisfies a given conditional expression.

30 Claims, 13 Drawing Sheets

OPTICAL SYSTEM, METHOD FOR FOCUSING, AND IMAGING APPARATUS EQUIPPED THEREWITH

The disclosure of the following priority applications are herein incorporated by reference:

Japanese Patent Application No. 2008-092663 filed on Mar. 31, 2008;

Japanese Patent Application No. 2008-092670 filed on Mar. 31, 2008; and

Japanese Patent Application No. 2008-092682 filed on Mar. 31, 2008.

BACKGROUND OF THE INVENTION

1. Field of the Invention

The present invention relates to an optical system, a method for focusing the optical system, and an imaging apparatus equipped therewith.

2. Related Background Art

There has been proposed an internal-focusing type optical system suitable for a film camera, an electronic still camera, a video camera, and the like as disclosed in such as Japanese Patent Application Laid-Open Nos. 7-199066, 3-200909.

In the conventional internal-focusing type optical systems, since refractive power balance between the focusing lens group and the other lens groups has not been optimized and specifications of optical glasses of the lenses composing the focusing lens group have not been optimized, it has been difficult to secure high focusing performance with keeping excellent optical performance over entire focusing range from infinity to a close distance.

SUMMARY OF THE INVENTION

The present invention is made in view of the above-described problems, and has an object to provide an optical system having excellent optical performance over entire focusing range from infinity to a close distance, a method for focusing the optical system, and an imaging apparatus equipped therewith.

According to a first aspect of the present invention, there is provided an optical system comprising, in order from an object: a first lens group having positive refractive power; and a second lens group having positive refractive power; the second lens group being movable along an optical axis for varying focusing; and the first lens group satisfying the following conditional expression (1):

$$2.50 < f1/f \qquad (1)$$

where f1 denotes a focal length of the first lens group, and f denotes a focal length of the optical system.

According to a second aspect of the present invention, there is provided an optical apparatus equipped with the optical system according to the first aspect.

According to a third aspect of the present invention, there is provided an optical system comprising, in order from an object: a first lens group having positive refractive power; and a second lens group having positive refractive power; the second lens group being movable along an optical axis for varying focusing, and at least two negative lenses in the second lens group satisfying the following conditional expressions (4), (5) and (6):

$$vdA < 50 \qquad (4)$$

$$0.00913 \times vdA + ndA < 2.16043 \qquad (5)$$

$$ndA < 1.66000 \qquad (6)$$

where vdA denotes an Abbe number of each of the negative lenses at d-line in which a wavelength λ=587.6 nm, and ndA denotes a refractive index of each of the negative lenses at d-line in which the wavelength λ=587.6 nm.

According to a fourth aspect of the present invention, there is provided an optical apparatus equipped with the optical system according to the third aspect.

According to a fifth aspect of the present invention, there is provided a method for manufacturing an optical system that includes, in order from an object, a first lens group having positive refractive power and a second lens group having positive refractive power, the method comprising steps of: disposing each lens of the first lens group and the second lens group so as to satisfy the following conditional expression (1):

$$2.50 < f1/f \qquad (1)$$

where f1 denotes a focal length of the first lens group and f denotes a focal length of the optical system; and disposing the second lens group movable along the optical axis upon varying focusing.

According to a sixth aspect of the present invention, there is provided a method for manufacturing an optical system that includes, in order from an object, a first lens group having positive refractive power and a second lens group having positive refractive power, the method comprising steps of: disposing at least two negative lenses in the second lens group satisfying the following conditional expressions (4), (5) and (6):

$$vdA < 50 \qquad (4)$$

$$0.00913 \times vdA + ndA < 2.16043 \qquad (5)$$

$$ndA < 1.66000 \qquad (6)$$

where vdA denotes an Abbe number of each of the negative lenses at d-line in which a wavelength λ=587.6 nm, and ndA denotes a refractive index of each of the negative lenses at d-line in which the wavelength λ=587.6 nm; and disposing the second lens group movable along an optical axis upon varying focusing.

The present invention makes it possible to provide an optical system having excellent optical performance over entire focusing range from infinity to a close distance, a method for focusing the optical system, and an imaging apparatus equipped therewith.

BRIEF DESCRIPTION OF THE DRAWINGS

FIGS. 2A, and 2B are graphs showing various aberrations of the optical system according to Example 1 of the first embodiment and Example 5 of the second embodiment, in which FIG. 2A shows upon focusing on an object locating at infinity, and FIG. 2B shows upon focusing on an object locating at a close distance (β=−0.11598).

FIGS. 4A, and 4B are graphs showing various aberrations of the optical system according to Example 2 of the first embodiment and Example 6 of the second embodiment, in which FIG. 4A shows upon focusing on an object locating at infinity, and FIG. 4B shows upon focusing on an object locating at a close distance (β=−0.11475).

FIGS. 6A, and 6B are graphs showing various aberrations of the optical system according to Example 3 of the first embodiment and Example 7 of the second embodiment, in which FIG. 6A shows upon focusing on an object locating at infinity, and FIG. 6B shows upon focusing on an object locating at a close distance ($\beta=-0.11579$).

FIGS. 8A, and 8B are graphs showing various aberrations of the optical system according to Example 4 of the first embodiment and Example 8 of the second embodiment, in which FIG. 8A shows upon focusing on an object locating at infinity, and FIG. 8B shows upon focusing on an object locating at a close distance ($\beta=-0.11454$).

FIGS. 10A, and 10B are graphs showing various aberrations of the optical system according to Example 9 of the second embodiment, in which FIG. 10A shows upon focusing on an object locating at infinity, and FIG. 10B shows upon focusing on an object locating at a close distance ($\beta=-0.11475$).

DESCRIPTION OF THE MOST PREFERRED EMBODIMENT

First Embodiment

Figure 1:
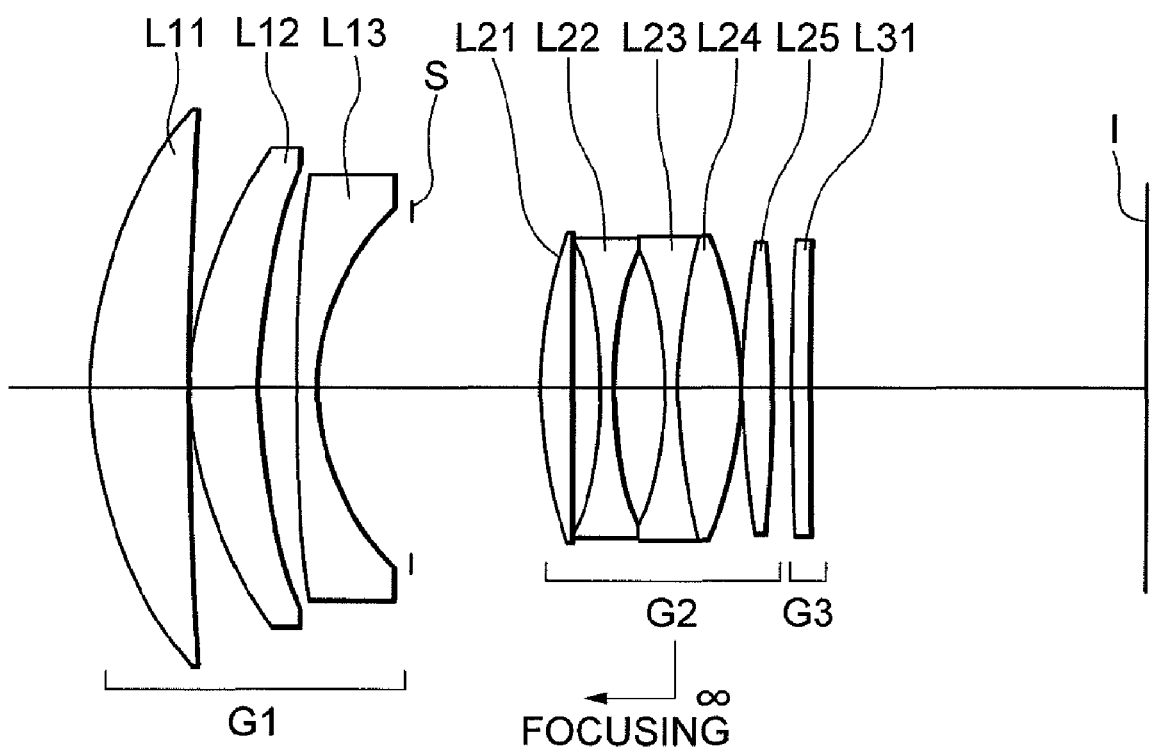
FIG. 1 is a sectional view showing a lens configuration of an optical system according to Example 1 of a first embodiment and Example 5 of a second embodiment.

An optical system according to a first embodiment of the present application is explained below.

An optical system according to the first embodiment includes, in order from an object, a first lens group having positive refractive power, and a second lens group having positive refractive power. The second lens group is movable along an optical axis for varying focusing. The first lens group satisfies the following conditional expression (1):

$$2.50 < f1/f \qquad (1)$$

where f1 denotes a focal length of the first lens group, and f denotes a focal length of the optical system.

With this lens configuration and satisfying conditional expression (1), it becomes possible to suppress various aberrations generated in the first lens group, so that excellent optical performance can be obtained.

Conditional expression (1) defines a ratio of refractive power of the first lens group to that of the optical system.

With satisfying conditional expression (1), when the focal length of the optical system is set to a given value, it becomes possible to obtain excellent optical performance over entire focusing range from infinity to a close object.

When the ratio f1/f is equal to or falls below the lower limit of conditional expression (1), refractive power of the first lens group becomes relatively strong, so that variation in spherical aberration becomes large, and it becomes difficult to secure excellent optical performance. Moreover, sine condition cannot be maintained, and it becomes difficult to secure excellent optical performance over entire focusing range from infinity to a close distance. In order to secure the effect of the first embodiment, it is preferable to set the lower limit of conditional expression (1) to 2.52.

Furthermore, it is preferable to set the upper limit of conditional expression (1) to 3.00. It is most preferable to set the upper limit of conditional expression (1) to 2.70.

In an optical system according to the first embodiment, it is preferable that the first lens group and the second lens group satisfy the following conditional expression (2):

$$2.60 < f1/f2 \qquad (2)$$

where f1 denotes a focal length of the first lens group, and f2 denotes a focal length of the second lens group.

Conditional expression (2) defines a ratio of refractive power of the first lens group to that of second lens group.

With satisfying conditional expression (2), various aberrations generating in the first lens group can be suppressed, and excellent optical performance can be obtained.

When the ratio f1/f2 is equal to or falls below the lower limit of conditional expression (2), refractive power of the first lens group becomes relatively strong, so that aberrations generating in the first lens group become excessively large. As a result, it becomes impossible to excellently correct curvature of field and coma. In order to secure the effect of the first embodiment, it is preferable to set the lower limit of conditional expression (2) to 2.80.

Furthermore, in order to suppress variation in curvature of field upon varying focusing from infinity to a close distance, it is preferable to set the upper limit of conditional expression (2) to 4.00. In order to further suppress variation in curvature of field, it is most preferable to set the upper limit of conditional expression (2) to 3.60.

In an optical system according to the first embodiment, the second lens group preferably satisfies the following conditional expression (3):

$$0.7 < f2/f < 1.2 \qquad (3)$$

where f1 denotes a focal length of the first lens group, and f2 denotes a focal length of the second lens group.

Conditional expression (3) defines an appropriate range of a ratio of refractive power of the second lens group to that of the optical system.

With satisfying conditional expression (3), it becomes possible to excellently correct various aberrations of the optical system and to accomplish high optical performance upon setting focal length of the optical system to a given value.

When the ratio f2/f is equal to or exceeds the upper limit of conditional expression (3), refractive power of the second lens group becomes relatively weak, and moving amount of the second lens group, which is the focusing lens group, becomes large, so that it becomes impossible to excellently correct curvature of field. In order to secure the effect of the first embodiment, it is preferable to set the upper limit of conditional expression (3) to 1.0.

On the other hand, when the ratio f2/f is equal to or falls below the lower limit of conditional expression (3), refractive power of the second lens group becomes relatively strong, so that it becomes impossible to excellently correct variation in spherical aberration upon varying the second lens group, which is the focusing lens group. In order to secure the effect of the first embodiment, it is preferable to set the lower limit of conditional expression (3) to 0.75.

In an optical system according to the first embodiment, an aperture stop is preferably disposed between the first lens group and the second lens group. With this lens configuration, it becomes possible to excellently correct off-axis chromatic aberration.

In an optical system according to the first embodiment, the first lens group is preferably fixed along the optical axis upon varying focusing. With this lens configuration, it becomes possible to make the optical system compact.

In an optical system according to the first embodiment, the second lens group preferably includes a cemented lens. With this lens configuration, it becomes possible to excellently correct longitudinal chromatic aberration and lateral chromatic aberration.

In an optical system according to the first embodiment, each lens surface of the optical system is preferably a spherical surface or a plane surface. With this lens configuration, lens processing becomes easy, so that deterioration in optical performance due to manufacturing error can be prevented. Moreover, even if the image plane is shifted, it becomes possible to reduce deterioration in optical performance.

In an optical system according to the first embodiment, it is preferable that the second lens group weighs as the first lens group or less. With this lens configuration, when the second lens group is used as a focusing lens group, a burden on a motor upon focusing can be lightened in comparison with a case when the first lens group is used as a focusing lens group. Moreover, it becomes suitable for being driven by a motor such as an ultrasonic motor.

A method for focusing an optical system according to the first embodiment comprising steps of: providing the optical system comprising, in order from an object, a first lens group having positive refractive power, and a second lens group having positive refractive power, the first lens group satisfying the following conditional expression (1):

$$2.50 < f1/f \qquad (1)$$

where f1 denotes a focal length of the first lens group, and f denotes a focal length of the optical system; and moving the second lens group along an optical axis for varying focusing.

With this lens configuration, it becomes possible to construct an internal-focusing type optical system having high optical performance.

Then, an optical system according to another aspect of the first embodiment is explained below.

An optical system according to another aspect of the first embodiment includes, in order from an object, a first lens group having positive refractive power, a second lens group having positive refractive power, and a third lens group having positive refractive power. The second lens group is movable along an optical axis for varying focusing. The first lens group and the second lens group satisfy the following conditional expression (2A):

$$2.75 < f1/f2 \qquad (2A)$$

where f1 denotes a focal length of the first lens group, and f2 denotes a focal length of the second lens group.

With this lens configuration, it becomes possible to obtain excellent optical performance with suppressing various aberrations generating in the first lens group.

Conditional expression (2A) defines a ratio of refractive power (focal length) of the first lens group to that of the second lens group.

When the ratio f1/f2 is equal to or falls below the lower limit of conditional expression (2A), refractive power of the first lens group becomes relatively strong (the focal length becomes small), so that aberrations generating in the first lens group become excessively large. As a result, it becomes impossible to excellently correct curvature of field and coma. Otherwise, refractive power of the second lens group becomes weak (the focal length becomes long), and a moving amount of the second lens group upon focusing becomes large, so that it becomes impossible to excellently correct curvature of field. In order to secure the effect of another aspect of the first embodiment, it is preferable to set the lower limit of conditional expression (2A) to 2.80.

When the upper limit of conditional expression (2A) is set to 4.00, it is preferable that variation in curvature of field upon varying focusing from an object locating at infinity to an object locating at a close distance becomes small. When the upper limit of conditional expression (2A) is set to 3.60, variation in curvature of field becomes smaller, so that it is most preferable.

In an optical system according to another aspect of the first embodiment, the following conditional expression (3) is preferably satisfied:

$$0.7 < f2/f < 1.2 \qquad (3)$$

where f2 denotes a focal length of the second lens group, and f denotes a focal length of the optical system.

With satisfying conditional expression (3), it becomes possible to excellently correct various aberrations of the optical system and to accomplish high optical performance upon setting focal length of the optical system to a given value.

When the ratio f2/f is equal to or exceeds the upper limit of conditional expression (3), refractive power of the second lens group becomes weak (the focal length becomes long), and moving amount of the second lens group, which is the focusing lens group, becomes large, so that it becomes impossible to excellently correct curvature of field. In order to secure the effect of another aspect of the first embodiment, it is preferable to set the upper limit of conditional expression (3) to 1.0.

On the other hand, when the ratio f2/f is equal to or falls below the lower limit of conditional expression (3), refractive power of the second lens group becomes strong (the focal length becomes short), a moving amount of the second lens group becomes large, so that it becomes impossible to excellently correct curvature of field. In order to secure the effect of another aspect of the first embodiment, it is preferable to set the lower limit of conditional expression (3) to 0.8.

In an optical system according to another aspect of the first embodiment, the first lens group preferably satisfies the following conditional expression (1A):

$$2.2 < f1/f < 2.8 \qquad (1A)$$

where f1 denotes a focal length of the first lens group, and f denotes a focal length of the optical system.

With this lens configuration and satisfying conditional expression (1A), when the focal length of the optical system is set to a given value, it becomes possible to obtain excellent optical performance over entire focusing range from infinity to a close distance.

When the value f1/f is equal to or exceeds the upper limit of conditional expression (1A), refractive power of the first lens group becomes weak (the focal length becomes long), variation in curvature of field caused by the movement of the second lens group upon focusing becomes too large, so that it becomes impossible to keep excellent optical performance over entire focusing range from infinity to a close distance. In order to secure the effect of another aspect of the first embodiment, it is preferable to set the upper limit of conditional expression (1A) to 2.7.

On the other hand, when the value f1/f is equal to or falls below the lower limit of conditional expression (1A), since refractive power of the first lens group becomes strong (the focal length becomes short), variation in spherical aberration becomes large, so that it becomes difficult to secure excellent optical performance. Moreover, sine condition cannot be maintained, it becomes difficult to secure excellent optical performance over entire focusing range from infinity to a close distance. In order to secure the effect of another aspect of the first embodiment, it is preferable to set the lower limit of conditional expression (1A) to 2.5.

In an optical system according to another aspect of the first embodiment, an aperture stop is preferably disposed between the first lens group and the second lens group. With this lens configuration, it becomes possible to excellently correct off-axis chromatic aberration.

In an optical system according to another aspect of the first embodiment, the first lens group is preferably fixed along the optical axis upon varying focusing. With this lens configuration, it becomes possible to make the optical system compact.

In an optical system according to another aspect of the first embodiment, the second lens group preferably includes a cemented lens. With this lens configuration, it becomes possible to excellently correct longitudinal chromatic aberration and lateral chromatic aberration.

In an optical system according to another aspect of the first embodiment, each lens surface of the optical system is preferably a spherical surface or a plane surface. With this lens configuration, lens processing becomes easy, so that deterioration in optical performance due to manufacturing error can be prevented. Moreover, even if the image plane is shifted, it becomes possible to mitigate deterioration in optical performance.

In an optical system according to another aspect of the first embodiment, it is preferable that the second lens group is lighter than the first lens group. With this lens configuration, when the second lens group is used as a focusing lens group, a burden on a motor upon focusing can be lightened in comparison with a case when the first lens group is used as a focusing lens group. Moreover, it becomes suitable for being driven by a motor such as ultrasonic motor.

A method for focusing an optical system according to another aspect of the first embodiment comprising steps of: providing the optical system comprising, in order from an object, a first lens group having positive refractive power, a second lens group having positive refractive power, and a third lens group having positive refractive power, the first lens group and the second lens group satisfying the following conditional expression (2A):

$$2.75 < f1/f2 \quad (2A)$$

where f1 denotes a focal length of the first lens group, and f2 denotes a focal length of the second lens group; and moving the second lens group along an optical axis for varying focusing.

With this lens configuration, it becomes possible to construct an internal-focusing type optical system having high optical performance.

Then, each example according to the first embodiment is explained with reference to accompanying drawings.

EXAMPLE 1

FIG. 1 is a sectional view showing a lens configuration of an optical system according to Example 1 of the first embodiment.

The optical system according to Example 1 includes, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having a convex surface facing the object, a positive meniscus lens L12 having a convex surface facing the object, and a negative meniscus lens L13 having a convex surface facing the object.

The second lens group G2 is composed of, in order from the object, a positive meniscus lens L21 having a convex surface facing the object, a double concave negative lens L22, a cemented lens constructed by a double concave negative lens L23 cemented with a double convex positive lens L24, and a double convex positive lens L25.

The third lens group G3 is composed of a positive meniscus lens L31 having a convex surface facing the object.

The second lens group G2 is movable to the object along an optical axis of the optical system for varying focusing from an object locating at infinity to an object locating at a close distance.

Various values associated with the optical system according to Example 1 are listed in Table 1.

In [Specifications], f denotes a focal length, FNO denotes an f-number, 2ω denotes an angle of view in degrees, Y denotes an image height, TL denotes a total lens length, and Bf denotes a back focal length upon focusing on an object locating at infinity.

In [Lens Data], the left most column "i" shows the surface number counted in order from the object side, the second column "r" shows a radius of curvature of the surface, the third column "d" shows a distance to the next surface, the fourth column "nd" shows a refractive index of the material at d-line (wavelength λ=587.6 nm), and the fifth column "νd" shows an Abbe number of the material at d-line (wavelength λ=587.6 nm). In the fifth column "nd" the refractive index of the air nd=1.000000 is omitted. In the second column "r", r=∞ denotes a plane surface. In the third column "d", Bf denotes a back focal length.

In [Variable Distances], "Infinity" denotes a case upon focusing on an object locating at infinity, "Close Distance" denotes a case focusing on an object locating at the close distance, di denotes a variable distance at the surface number i, β denotes an imaging magnification, Bf denotes a back focal length, and d0 denotes a distance between the most object side lens surface and the object.

In [Lens Group Data], a starting surface number "i" and a focal length of each lens group are shown.

In [Values for Conditional Expressions], a value for each conditional expression is shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Specifications]

| | |
|---|---|
| f = | 86.0 |
| FNO = | 1.44 |
| 2ω = | 28.39 |
| Y = | 21.60 |
| TL = | 120.98 |
| Bf = | 38.12 |

[Lens Data]

| i | r | d | nd | νd |
|---|---|---|---|---|
| 1 | 48.8417 | 11.20 | 1.60300 | 65.47 |
| 2 | 448.8233 | 0.10 | | |
| 3 | 44.0159 | 7.60 | 1.80400 | 46.58 |
| 4 | 67.5908 | 4.64 | | |
| 5 | 204.7044 | 2.30 | 1.67270 | 32.11 |
| 6 | 28.5061 | 10.70 | | |
| 7 | ∞ | (d7) | Aperture Stop S | |
| 8 | 52.1712 | 3.60 | 1.77250 | 49.61 |
| 9 | 14443.5010 | 3.30 | | |
| 10 | −49.7521 | 1.50 | 1.58144 | 40.75 |
| 11 | 48.8814 | 6.00 | | |
| 12 | −43.0322 | 1.40 | 1.58144 | 40.75 |
| 13 | 62.8163 | 7.30 | 1.77250 | 49.61 |
| 14 | −41.0534 | 0.10 | | |
| 15 | 100.8291 | 3.40 | 1.69680 | 55.52 |
| 16 | −187.3176 | (d16) | | |
| 17 | 329.9899 | 2.00 | 1.77250 | 49.61 |
| 18 | 780.7371 | Bf | | |

[Lens Group Data]

| Group | i | focal length |
|---|---|---|
| G1 | 1 | 219.1428 |
| G2 | 8 | 71.9802 |
| G3 | 17 | 715.7011 |

[Variable Distances]

| | Infinity | Close Distance |
|---|---|---|
| β = | 0.0000 | −0.11598 |
| d0 = | ∞ | 731.5216 |
| d7 = | 14.91346 | 2.53213 |
| d16 = | 3.60003 | 15.98136 |
| Bf = | 38.12 | 38.12 |

[Values for Conditional Expressions]

| | |
|---|---|
| (1), (1A): f1/f = | 2.548 |
| (2), (2A): f1/f2 = | 3.04 |
| (3): f2/f = | 0.837 |

Figure 2A:
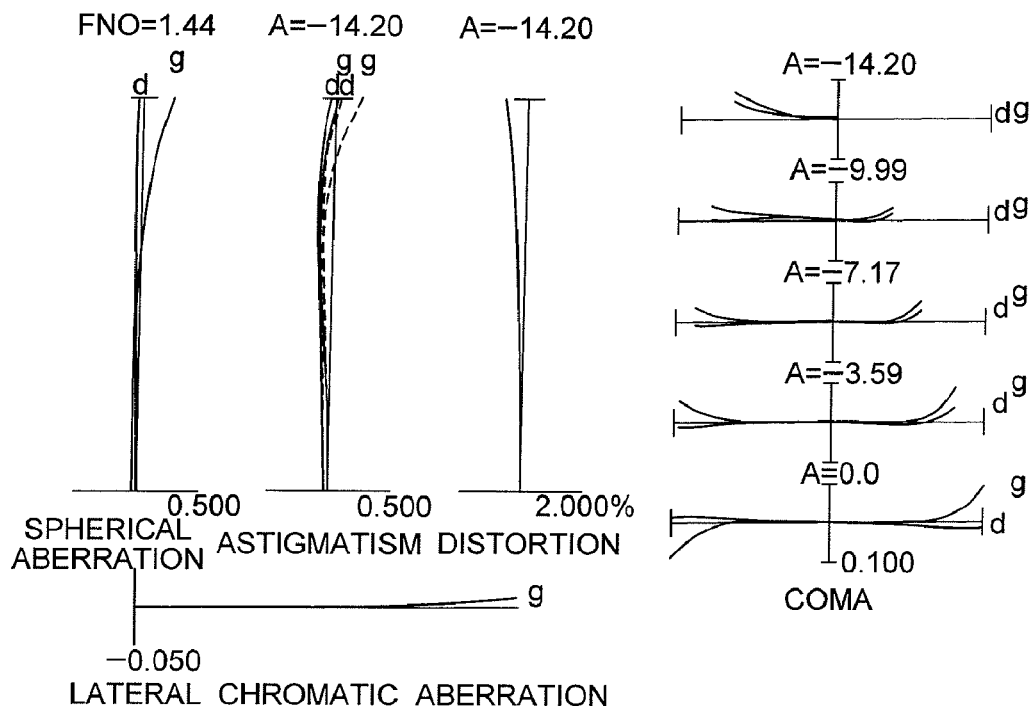
Figure 2B:
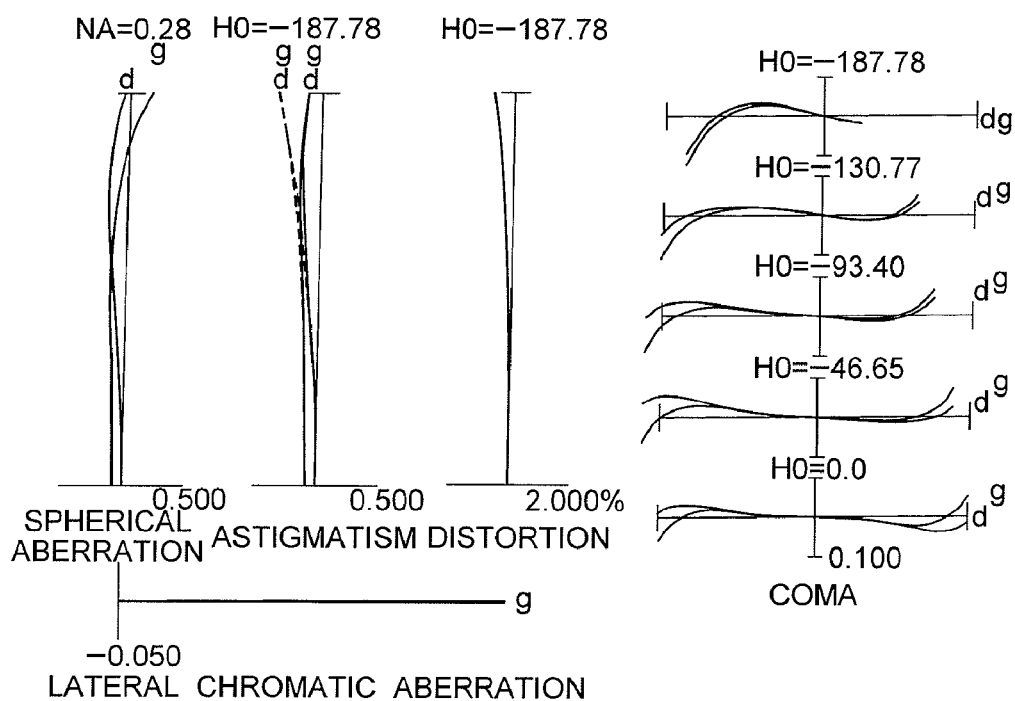

FIGS. 2A, and 2B are graphs showing various aberrations of the optical system according to Example 1 of the first embodiment, in which FIG. 2A shows upon focusing on an object locating at infinity, and FIG. 2B shows upon focusing on an object locating at a close distance (β=−0.11598). Here, the image height is Y=21.60.

In respective graphs, FNO denotes an f-number, A denotes a half angle of view in degrees, and NA denotes a numerical aperture. In respective graphs, D denotes aberration curve at d-line (wavelength λ=587.6 nm), and g denotes aberration curve at g-line (wavelength λ=435.8 nm). In graphs showing spherical aberration and astigmatism, a solid line indicates a sagittal image plane, and a broken line indicates a meridional image plane. In graphs showing spherical aberration, an f-number or a numerical aperture with respect to the maximum aperture is shown. In graphs showing astigmatism and distortion, the maximum value of the image height is shown. In graphs showing coma, respective image heights are shown. The above-described explanations regarding various aberration graphs are the same as the other Examples, so that duplicated explanations are omitted.

As is apparent from the respective graphs, the optical system according to Example 1 shows superb optical performance as a result of good corrections to various aberrations.

EXAMPLE 2

Figure 3:
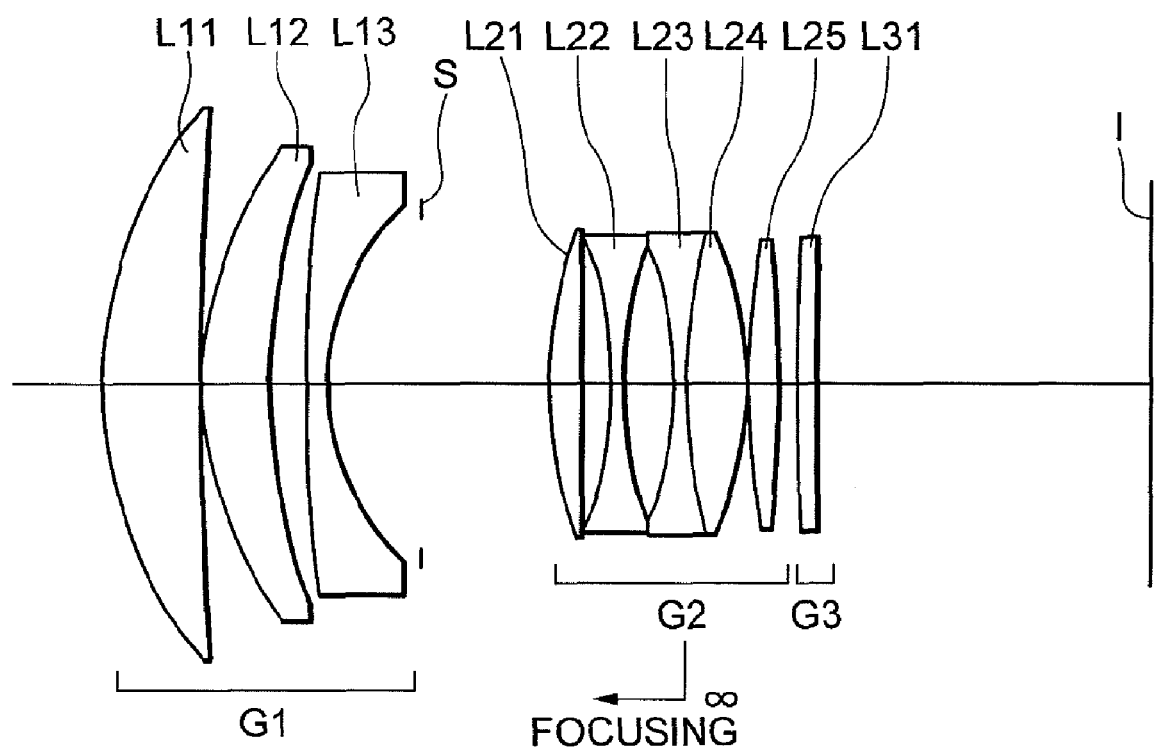
FIG. 3 is a sectional view showing a lens configuration of an optical system according to Example 2 of the first embodiment and Example 6 of the second embodiment.

FIG. 3 is a sectional view showing a lens configuration of an optical system according to Example 2 of the first embodiment.

The optical system according to Example 2 includes, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having a convex surface facing the object, a positive meniscus lens L12 having a convex surface facing the object, and a negative meniscus lens L13 having a convex surface facing the object.

The second lens group G2 is composed of, in order from the object, a positive meniscus lens L21 having a convex surface facing the object, a double concave negative lens L22, a cemented lens constructed by a double concave negative lens L23 cemented with a double convex positive lens L24, and a double convex positive lens L25.

The third lens group G3 is composed of a positive meniscus lens L31 having a convex surface facing the object.

The second lens group G2 is movable to the object along an optical axis of the optical system for varying focusing from an object locating at infinity to an object locating at a close distance.

Various values associated with the optical system according to Example 2 are listed in Table 2.

TABLE 2

[Specifications]

| | |
|---|---|
| f = | 85.0 |
| FNO = | 1.44 |
| 2ω = | 28.75 |
| Y = | 21.60 |
| TL = | 120.76 |
| Bf = | 38.12 |

[Lens Data]

| i | r | d | nd | νd |
|---|---|---|---|---|
| 1 | 49.6722 | 11.20 | 1.60300 | 65.47 |
| 2 | 357.8769 | 0.10 | | |
| 3 | 43.3361 | 7.60 | 1.80400 | 46.58 |
| 4 | 66.3322 | 4.42 | | |
| 5 | 161.8658 | 2.30 | 1.67270 | 32.11 |
| 6 | 28.5061 | 10.70 | | |
| 7 | ∞ | (d7) | Aperture Stop S | |
| 8 | 51.3573 | 3.60 | 1.80400 | 46.58 |
| 9 | 2180.315 | 3.30 | | |
| 10 | −52.2845 | 1.50 | 1.60342 | 38.00 |
| 11 | 48.3972 | 6.00 | | |
| 12 | −43.1588 | 1.40 | 1.60342 | 38.00 |
| 13 | 62.8163 | 7.30 | 1.80400 | 46.58 |
| 14 | −41.997 | 0.10 | | |
| 15 | 105.218 | 3.40 | 1.69680 | 55.52 |
| 16 | −187.318 | (d16) | | |
| 17 | 306.5836 | 2.00 | 1.77250 | 49.61 |
| 18 | 819.5894 | Bf | | |

TABLE 2-continued

[Lens Group Data]

| Group | i | focal length |
|---|---|---|
| G1 | 1 | 218.15933 |
| G2 | 8 | 73.20767 |
| G3 | 17 | 616.32650 |

[Variable Distances]

| | Infinity | Close Distance |
|---|---|---|
| β = | 0.0000 | −0.11475 |
| d0 = | ∞ | 731.5216 |
| d7 = | 14.91346 | 2.53213 |
| d16 = | 2.29346 | 14.67479 |
| Bf = | 38.12 | 38.12 |

[Values for Conditional Expressions]

| (1), (1A): f1/f = | 2.567 |
|---|---|
| (2), (2A): f1/f2 = | 2.98 |
| (3): f2/f = | 0.861 |

Figure 4A:
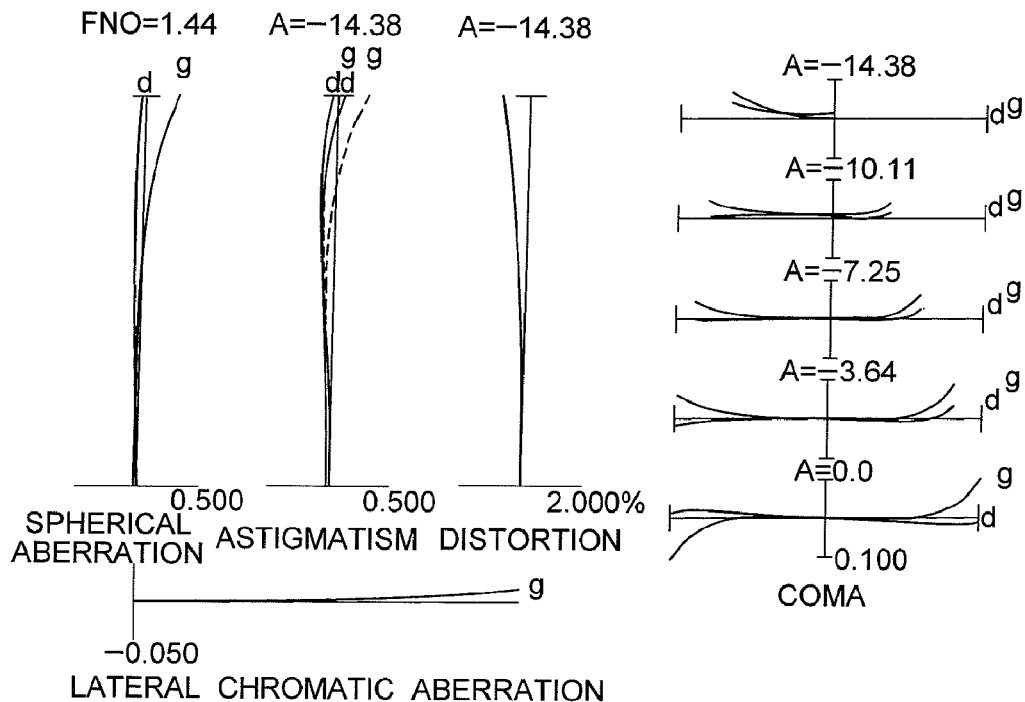
Figure 4B:
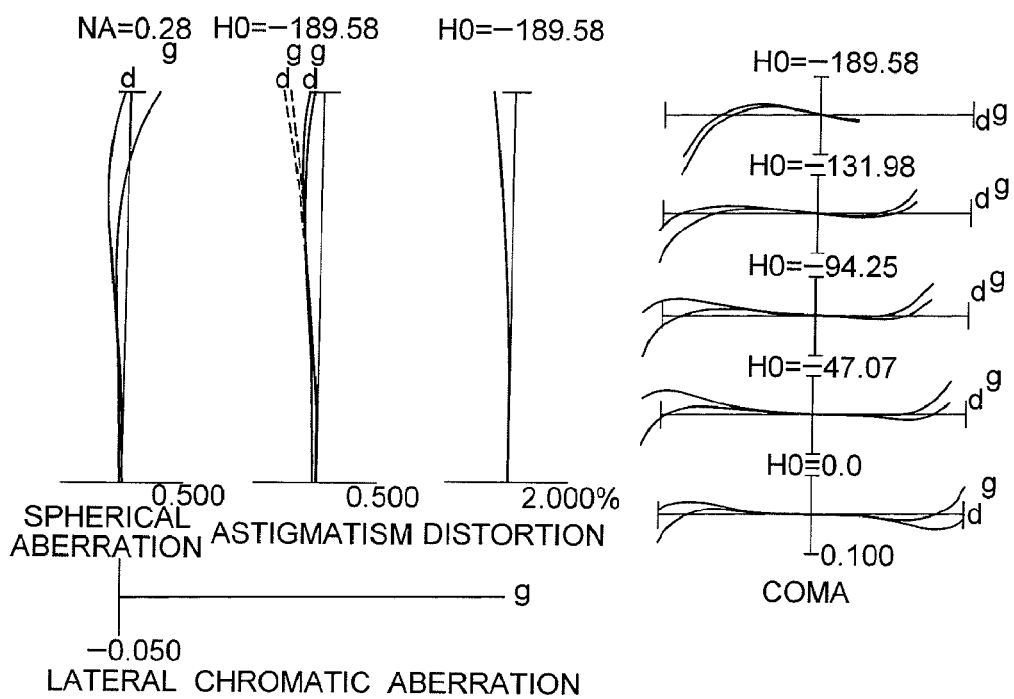

FIGS. 4A, and 4B are graphs showing various aberrations of the optical system according to Example 2 of the first embodiment, in which FIG. 4A shows upon focusing on an object locating at infinity, and FIG. 4B shows upon focusing on an object locating at a close distance (β=−0.11475). Here, the image height is Y=21.60.

As is apparent from the respective graphs, the optical system according to Example 2 shows superb optical performance as a result of good corrections to various aberrations.

EXAMPLE 3

Figure 5:
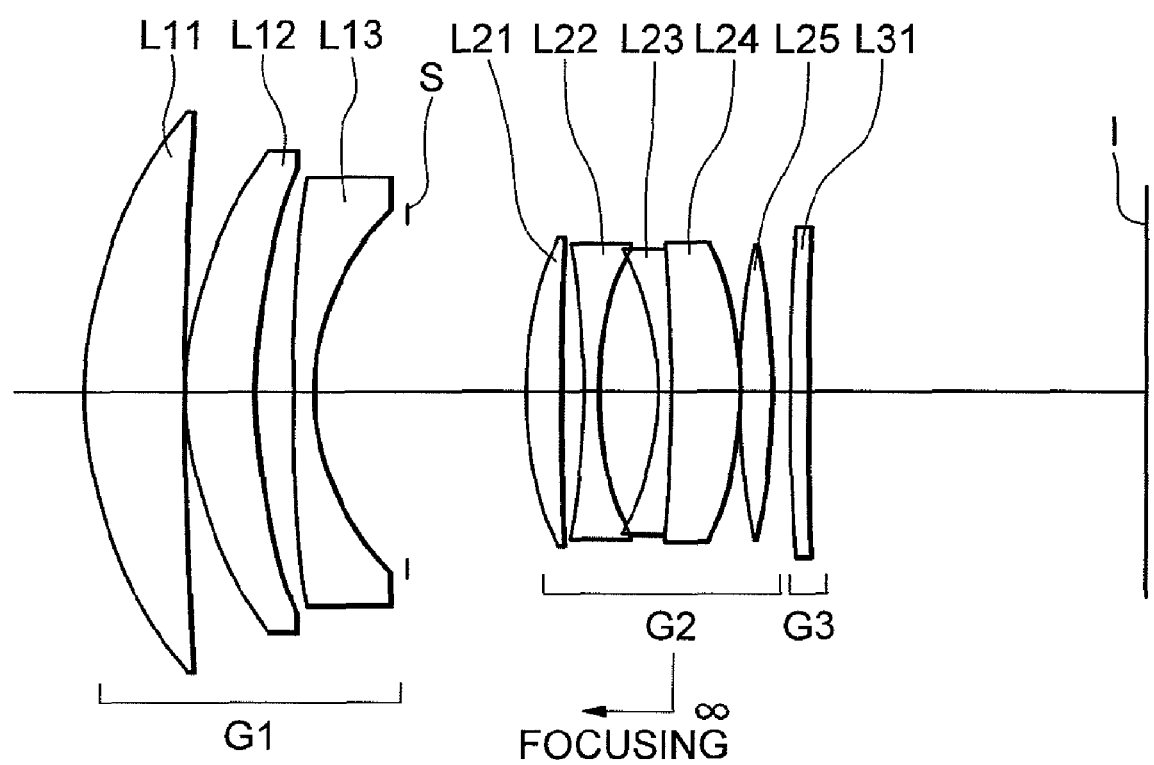
FIG. 5 is a sectional view showing a lens configuration of an optical system according to Example 3 of the first embodiment and Example 7 of the second embodiment.

FIG. 5 is a sectional view showing a lens configuration of an optical system according to Example 3 of the first embodiment.

The optical system according to Example 3 includes, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having a convex surface facing the object, a positive meniscus lens L12 having a convex surface facing the object, and a negative meniscus lens L13 having a convex surface facing the object.

The second lens group G2 is composed of, in order from the object, a positive meniscus lens L21 having a convex surface facing the object, a double concave negative lens L22, a cemented lens constructed by a negative meniscus lens L23 having a concave surface facing the object cemented with a positive meniscus lens L24 having a convex surface facing the image plane I, and a double convex positive lens L25.

The third lens group G3 is composed of a positive meniscus lens L31 having a convex surface facing the object.

The second lens group G2 is movable to the object along an optical axis of the optical system for varying focusing from an object locating at infinity to an object locating at a close distance.

Various values associated with the optical system according to Example 3 are listed in Table 3.

TABLE 3

[Specifications]

| f = | 86.0 |
|---|---|
| FNO = | 1.44 |
| 2ω = | 28.38 |
| Y = | 21.60 |
| TL = | 120.87 |
| Bf = | 38.12 |

[Lens Data]

| i | r | d | nd | νd |
|---|---|---|---|---|
| 1 | 48.8417 | 11.20 | 1.60300 | 65.47 |
| 2 | 448.8233 | 0.10 | | |
| 3 | 44.0159 | 7.60 | 1.80400 | 46.58 |
| 4 | 67.5908 | 4.64 | | |
| 5 | 204.7044 | 2.30 | 1.67270 | 32.11 |
| 6 | 28.5061 | 10.70 | | |
| 7 | ∞ | (d7) | Aperture Stop S | |
| 8 | 44.3052 | 4.20 | 1.83481 | 42.72 |
| 9 | 701.4073 | 2.50 | | |
| 10 | −84.1675 | 1.50 | 1.62004 | 36.30 |
| 11 | 40.6158 | 7.00 | | |
| 12 | −34.0106 | 1.50 | 1.67270 | 32.11 |
| 13 | −156.805 | 7.60 | 1.83481 | 42.72 |
| 14 | −43.4693 | 0.10 | | |
| 15 | 97.7847 | 3.60 | 1.69680 | 55.52 |
| 16 | −81.5801 | (d16) | | |
| 17 | 329.9899 | 2.00 | 1.77250 | 49.61 |
| 18 | 780.7371 | Bf | | |

[Lens Group Data]

| Group | i | focal length |
|---|---|---|
| G1 | 1 | 219.14277 |
| G2 | 8 | 71.98016 |
| G3 | 17 | 715.70110 |

[Variable Distances]

| | Infinity | Close Distance |
|---|---|---|
| β = | 0.0000 | −0.11579 |
| d0 = | ∞ | 731.5216 |
| d7 = | 13.60145 | 1.22012 |
| d16 = | 2.09728 | 14.47861 |
| Bf = | 38.12 | 38.12 |

[Values for Conditional Expressions]

| (1), (1A): f1/f = | 2.548 |
|---|---|
| (2), (2A): f1/f2 = | 3.04 |
| (3): f2/f = | 0.837 |

Figure 6A:
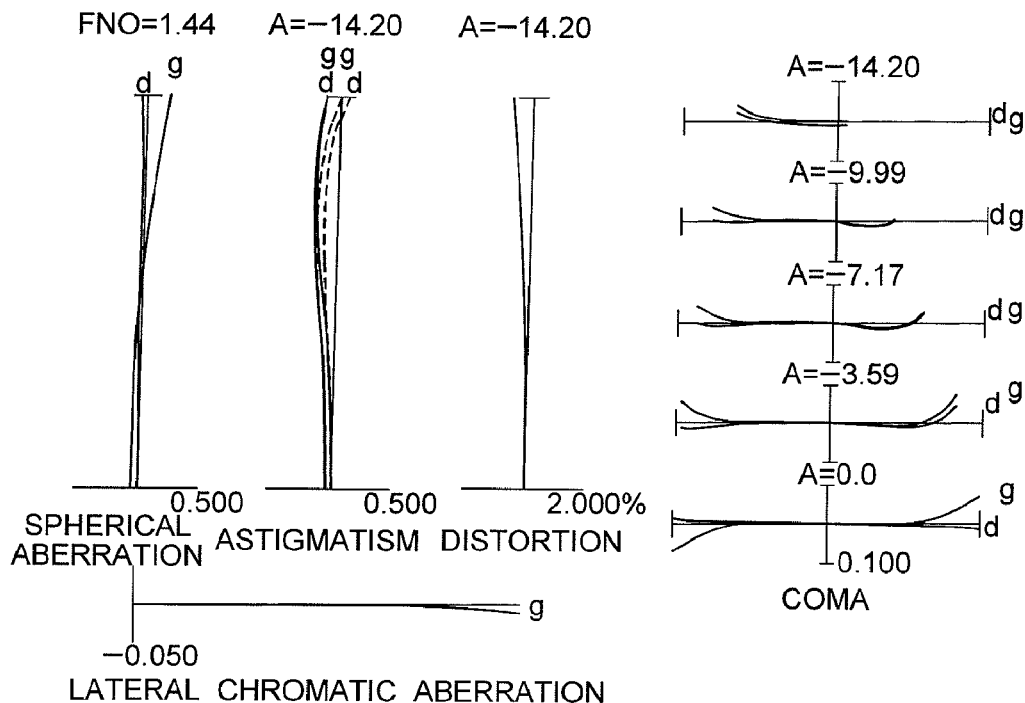
Figure 6B:
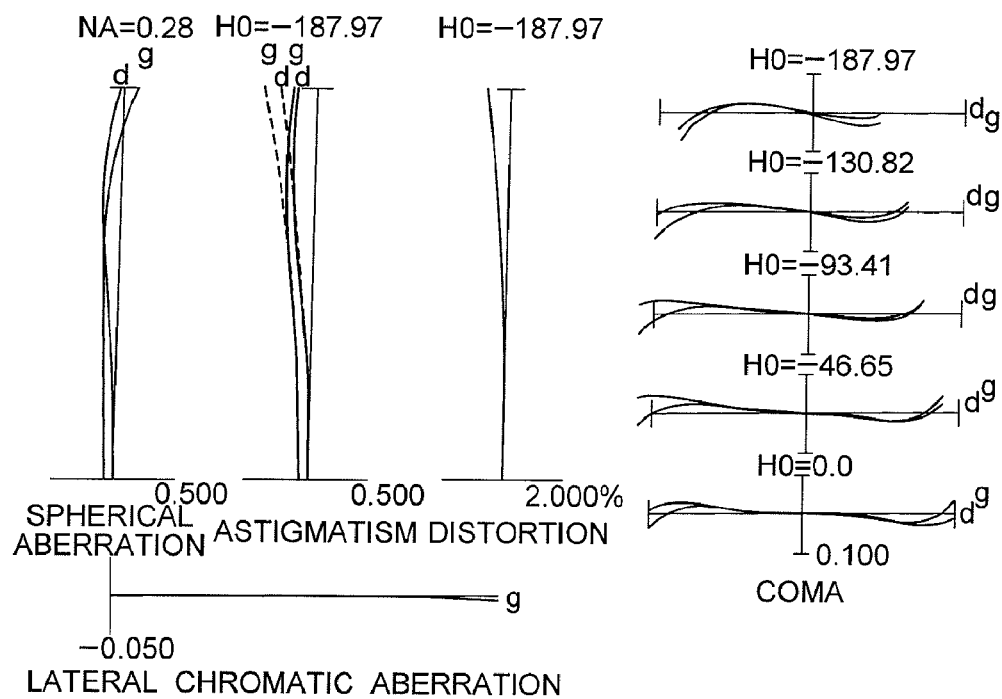

FIGS. 6A, and 6B are graphs showing various aberrations of the optical system according to Example 3 of the first embodiment, in which FIG. 6A shows upon focusing on an object locating at infinity, and FIG. 6B shows upon focusing on an object locating at a close distance (β=−0.11579). Here, the image height is Y=21.60.

As is apparent from the respective graphs, the optical system according to Example 3 shows superb optical performance as a result of good corrections to various aberrations.

EXAMPLE 4

Figure 7:
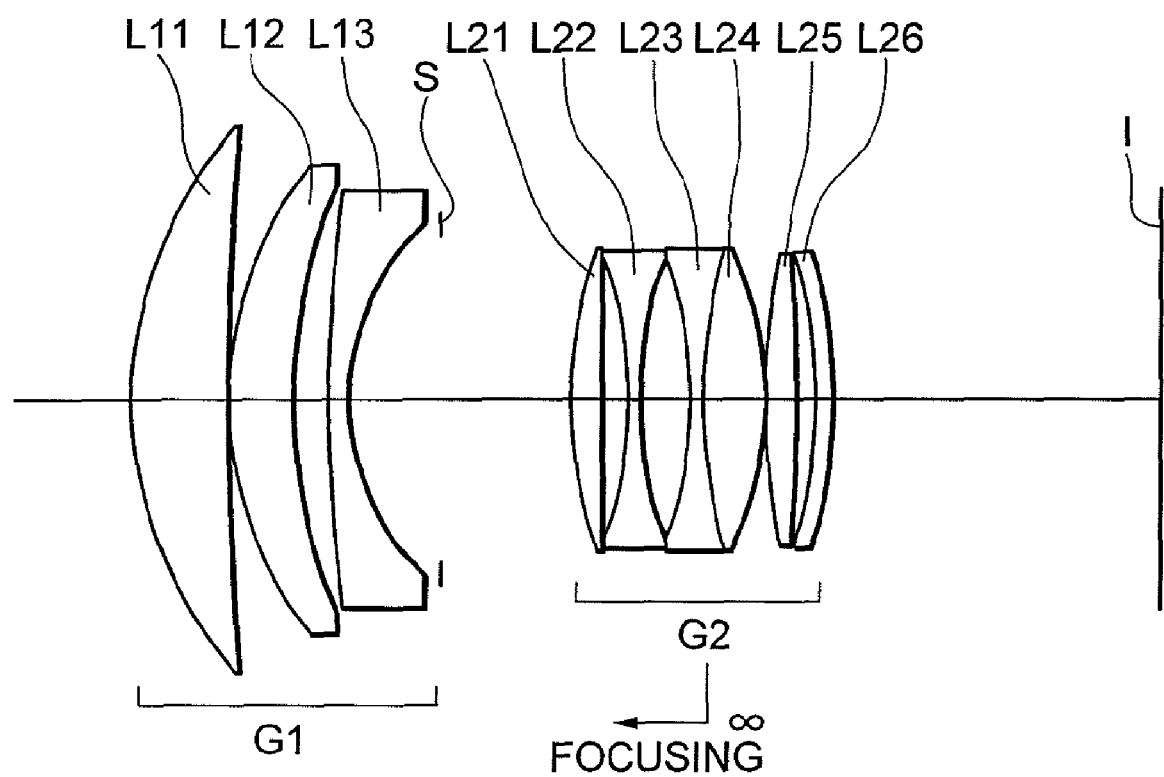
FIG. 7 is a sectional view showing a lens configuration of an optical system according to Example 4 of the first embodiment and Example 8 of the second embodiment.

FIG. 7 is a sectional view showing a lens configuration of an optical system according to Example 4 of the first embodiment.

The optical system according to Example 4 includes, in order from an object, a first lens group G1 having positive refractive power, and a second lens group G2 having positive refractive power.

An aperture stop S is disposed between the first lens group G1 and the second lens group G2.

The first lens group G1 is composed of, in order from the object, a positive meniscus lens L11 having a convex surface facing the object, a positive meniscus lens L12 having a convex surface facing the object, and a negative meniscus lens L13 having a convex surface facing the object.

The second lens group G2 is composed of, in order from the object, a double convex positive lens L21, a double concave negative lens L22, a cemented lens constructed by a double concave negative lens L23 cemented with a double convex positive lens L24, a double convex positive lens L25, and a negative meniscus lens L26 having a concave surface facing the object.

The second lens group G2 is movable to the object along an optical axis of the optical system for varying focusing from an object locating at infinity to an object locating at a close distance.

Various values associated with the optical system according to Example 4 are listed in Table 4.

TABLE 4

[Specifications]

| | |
|---|---|
| f = | 86.0 |
| FNO = | 1.45 |
| 2ω = | 28.40 |
| Y = | 21.60 |
| TL = | 120.20 |
| Bf = | 38.08 |

[Lens Data]

| i | r | d | nd | vd |
|---|---|---|---|---|
| 1 | 47.1005 | 11.20 | 1.60300 | 65.47 |
| 2 | 389.6297 | 0.10 | | |
| 3 | 43.2050 | 7.60 | 1.80400 | 46.58 |
| 4 | 64.2685 | 4.23 | | |
| 5 | 193.6555 | 2.30 | 1.67270 | 32.11 |
| 6 | 28.1335 | 10.70 | | |
| 7 | ∞ | (d7) | Aperture Stop S | |
| 8 | 51.1641 | 3.60 | 1.77250 | 49.61 |
| 9 | −1655.5923 | 3.30 | | |
| 10 | −46.1050 | 1.50 | 1.58144 | 40.75 |
| 11 | 49.8060 | 6.00 | | |
| 12 | −44.6366 | 1.40 | 1.58144 | 40.75 |
| 13 | 62.8163 | 7.30 | 1.77250 | 49.61 |
| 14 | −38.9308 | 0.10 | | |
| 15 | 93.9046 | 3.40 | 1.69680 | 55.52 |
| 16 | −187.3176 | 2.29 | | |
| 17 | −57.0412 | 2.00 | 1.77250 | 49.61 |
| 18 | −59.6536 | (d18) | | |

[Lens Group Data]

| Group | i | focal length |
|---|---|---|
| G1 | 1 | 219.14277 |
| G2 | 8 | 65.48955 |

[Variable Distances]

| | Infinity | Close Distance |
|---|---|---|
| β = | 0.00000 | −0.11454 |
| d0 = | ∞ | 731.5216 |
| d7 = | 15.10219 | 4.28681 |
| d18 (Bf) = | 38.08 | 48.89 |

[Values for Conditional Expressions]

| | |
|---|---|
| (1): f1/f = | 2.548 |
| (2): f1/f2 = | 3.35 |
| (3): f2/f = | 0.762 |

Figure 8A:
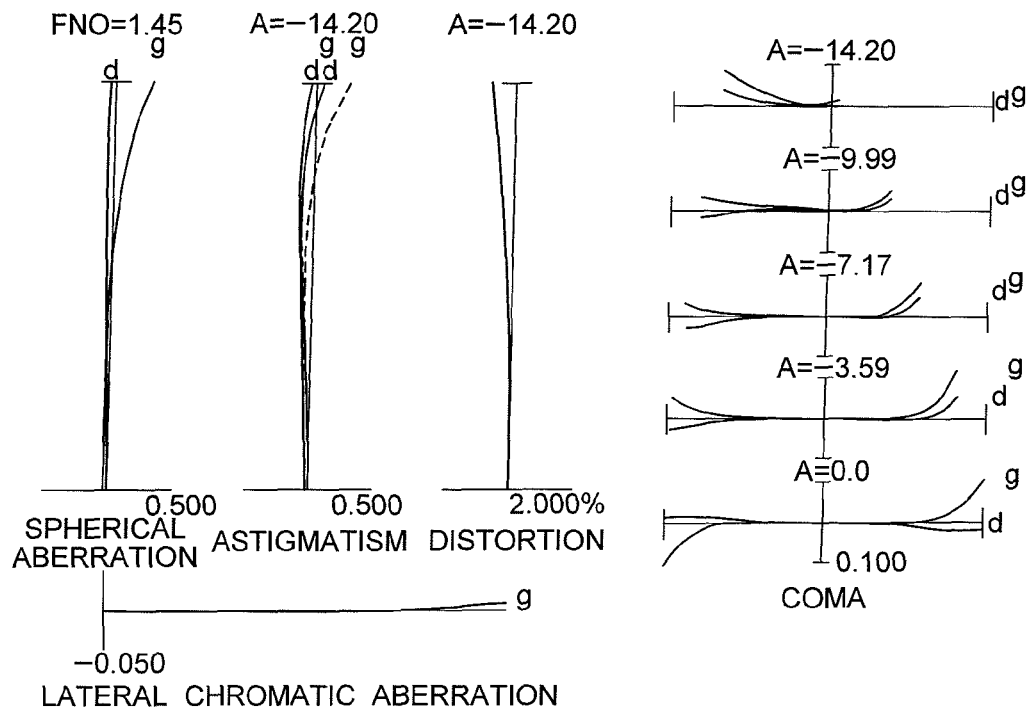
Figure 8B:
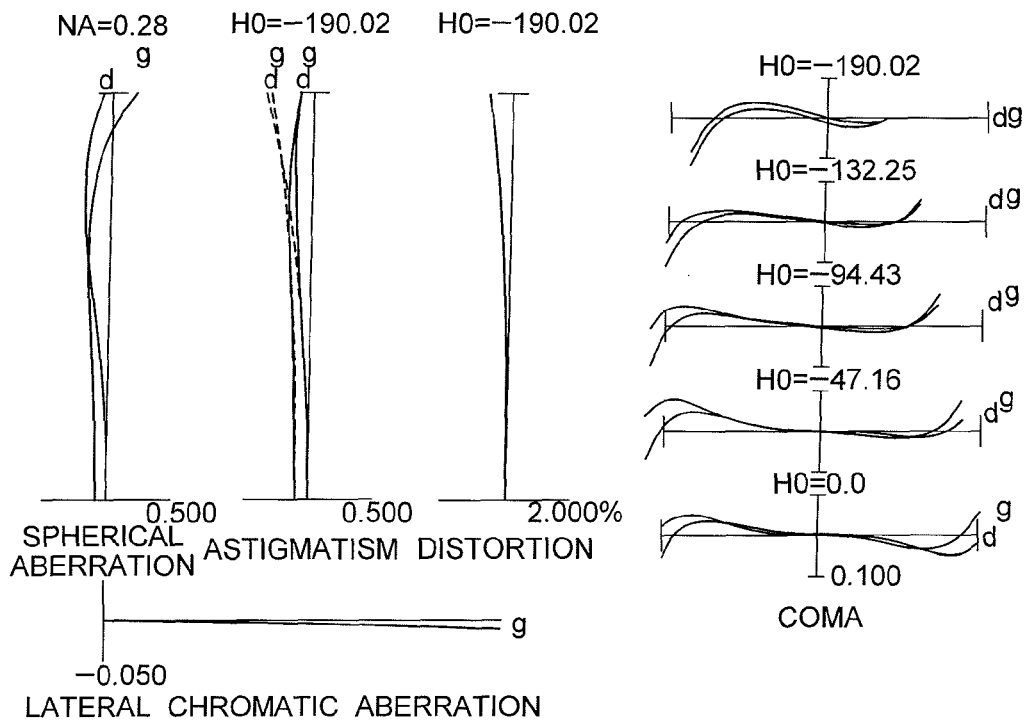

FIGS. 8A, and 8B are graphs showing various aberrations of the optical system according to Example 4 of the first embodiment, in which FIG. 8A shows upon focusing on an object locating at infinity, and FIG. 8B shows upon focusing on an object locating at a close distance (β=−0.11454). Here, the image height is Y=21.60.

As is apparent from the respective graphs, the optical system according to Example 4 shows superb optical performance as a result of good corrections to various aberrations.

An outline of a method for manufacturing the optical system according to the first embodiment including, in order from an object, a first lens group G1 having positive refractive power, and a second lens group G2 having positive refractive power is explained below with reference to FIG. 12.

Figure 12:
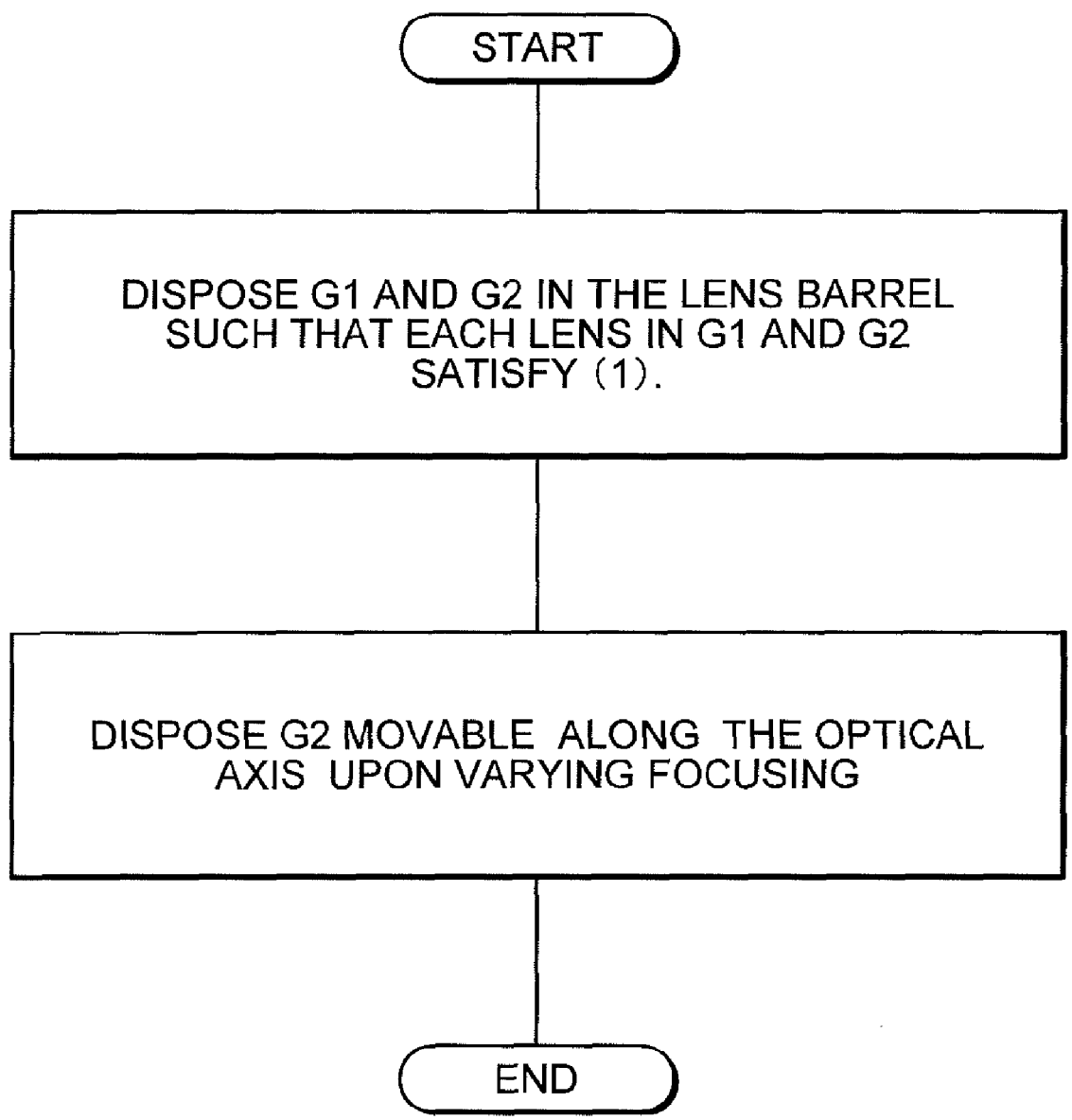
FIG. 12 is a flowchart showing a procedure of a method for manufacturing the optical system according to the first embodiment.

FIG. 12 is a flowchart showing a procedure of a method for manufacturing the optical system according to the first embodiment.

At first, each lens of the first lens group G1, and the second lens group G2 is disposed in a lens barrel having cylindrical shape such that each lens in the first lens group G1 and the second lens group G2 satisfies the following conditional expression (1):

$$2.50 < f1/f \qquad (1)$$

where f1 denotes a focal length of the first lens group, and f denotes a focal length of the optical system. Then, the second lens group G2 is disposed movable along the optical axis upon varying focusing.

Second Embodiment

An optical system according to a second embodiment of the present application is explained below.

An optical system according to the second embodiment includes, in order from an object, a first lens group having positive refractive power, and a second lens group having positive refractive power. The second lens group is movable along an optical axis for varying focusing. At least two negative lenses in the second lens group satisfy the following conditional expressions (4), (5) and (6):

$$vdA < 50 \qquad (4)$$

$$0.00913 \times vdA + ndA < 2.16043 \qquad (5)$$

$$ndA < 1.66000 \qquad (6)$$

where vdA denotes an Abbe number of each of the negative lenses in the second lens group at d-line in which the wavelength λ=587.6 nm, and ndA denotes a refractive index of each of the negative lenses in the second lens group at d-line in which the wavelength λ=587.6 nm.

Conditional expression (4) defines an Abbe number of the negative lens in the second lens group. With satisfying conditional expression (4), it becomes possible to excellently correct off-axis chromatic aberration, so that excellent optical performance can be attained.

When the value vdA is equal to or exceeds the upper limit of conditional expression (4), the Abbe number of the negative lens in the second lens group becomes excessively large, so that it becomes impossible to excellently correct off-axis chromatic aberration of the optical system. In order to secure the effect of the second embodiment, it is preferable to set the upper limit of conditional expression (4) to 46.

Conditional expression (5) defines an appropriate range of the Abbe number and the refractive index of the negative lens in the second lens group. With satisfying conditional expression (5), it becomes possible to excellently correct off-axis chromatic aberration, so that excellent optical performance can be attained. Moreover, the second lens group can be lightened, and high focusing accuracy can be attained.

When the value $0.00913 \times vdA + ndA$ is equal to or exceeds the upper limit of conditional expression (5), the Abbe number of the negative lens in the second lens group becomes too large, so that it becomes impossible to excellently correct on-axis chromatic aberration. In order to secure the effect of the second embodiment, it is preferable to set the upper limit of conditional expression (5) to 2.14543.

Conditional expression (6) defines a refractive index of the negative lens in the second lens group. With satisfying conditional expression (6), it becomes possible to secure excellent optical performance over entire focusing range from infinity to a close distance. Moreover, the second lens group can be lightened, and high focusing accuracy can be attained.

When the value ndA is equal to or exceeds the upper limit of conditional expression (6), refractive power of the negative lens in the second lens group becomes weak, and positive refractive power becomes relatively strong, so that it becomes impossible to excellently correct curvature of field upon focusing. Moreover, refractive index of the negative lens becomes large, and specific gravity of the lens becomes too large, so that it becomes difficult to attain high focusing accuracy. In order to secure the effect of the second embodiment, it is preferable to set the upper limit of conditional expression (6) to 1.65000.

In an optical system according to the second embodiment, at least one positive lens in the second lens group preferably satisfies the following conditional expressions (7) and (8):

$$1.64000 < ndB < 1.86000 \quad (7)$$

$$1.88333 < 0.00667 \times vdB + ndB \quad (8)$$

where ndB denotes a refractive index of the positive lens in the second lens group at d-line in which the wavelength $\lambda = 587.6$ nm, and vdB denotes an Abbe number of the positive lens in the second lens group at d-line in which the wavelength $\lambda = 587.6$ nm.

Conditional expression (7) defines the refractive index of the positive lens in the second lens group. With satisfying conditional expression (7), excellent optical performance can be attained over entire focusing range from infinity to a close distance.

When the value ndB is equal to or exceeds the upper limit of conditional expression (7), refractive power of the second lens group becomes strong, so that on-axis chromatic aberration cannot be excellently corrected. Moreover, as refractive index of the positive lens becomes large, the specific gravity of the lens becomes large, so that it becomes difficult to attain high focusing accuracy. In order to secure the effect of the second embodiment, it is preferable to set the upper limit of conditional expression (7) to 1.84000.

On the other hand, when the value ndB is equal to or falls below the lower limit of conditional expression (7), refractive power of the second lens group becomes too weak, so that it becomes impossible to excellently correct spherical aberration. In order to secure the effect of the second embodiment, it is preferable to set the lower limit of conditional expression (7) to 1.65000.

Conditional expression (8) defines an appropriate range of the refractive index and the Abbe number of the positive lens in the second lens group. With satisfying conditional expression (8), excellent optical performance can be attained over entire focusing range from infinity to a close distance.

When the value $0.00667 \times vdB + ndB$ is equal to or falls below the lower limit of conditional expression (8), the Abbe number of the positive lens in the second lens group becomes small, so that off-axis chromatic aberration cannot be excellently corrected. In order to secure the effect of the second embodiment, it is preferable to set the lower limit of conditional expression (8) to 1.89333.

In an optical system according to the second embodiment, an aperture stop is preferably disposed between the first lens group and the second lens group. With this lens configuration, it becomes possible to excellently correct off-axis chromatic aberration.

In an optical system according to the second embodiment, the first lens group is preferably fixed along the optical axis upon varying focusing. With this lens configuration, it becomes possible to make the optical system compact.

In an optical system according to the second embodiment, the second lens group preferably includes a cemented lens. With this lens configuration, it becomes possible to excellently correct on-axis chromatic aberration and off-axis chromatic aberration.

In an optical system according to the second embodiment, each lens surface of the optical system is preferably a spherical surface or a plane surface. With this lens configuration, lens processing becomes easy, so that deterioration in optical performance due to manufacturing error can be prevented. Moreover, even if the image plane is shifted, it becomes possible to reduce deterioration in optical performance.

In an optical system according to the second embodiment, it is preferable that the second lens group is lighter than the first lens group. With this lens configuration, when the second lens group is used as a focusing lens group, a burden on a motor upon focusing can be lightened in comparison with a case when the first lens group is used as a focusing lens group. Moreover, it becomes suitable for being driven by a motor such as ultrasonic motor.

A method for focusing an optical system according to the second embodiment comprising steps of: providing the optical system including, in order from an object, a first lens group having positive refractive power, and a second lens group having positive refractive power, at least two negative lens in the second lens group satisfying the following conditional expressions (4), (5) and (6):

$$vdA < 50 \quad (4)$$

$$0.00913 \times vdA + ndA < 2.16043 \quad (5)$$

$$ndA < 1.66000 \quad (6)$$

where vdA denotes an Abbe number of each of the negative lenses in the second lens group at d-line in which the wavelength $\lambda = 587.6$ nm, and ndA denotes a refractive index of each of the negative lenses in the second lens group at d-line in which the wavelength $\lambda = 587.6$ nm; and moving the second lens group along an optical axis upon varying focusing.

With this lens configuration, it becomes possible to attain an internal-focusing type optical system having high optical performance.

Each example according to the second embodiment is explained with reference to accompanying drawings.

EXAMPLE 5

FIG. 1 is a sectional view showing a lens configuration of an optical system according to Example 5 of the second embodiment.

The optical system according to Example 5 is composed of, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having convex surface facing the object, a positive meniscus lens L12 having convex surface facing the object, and a negative meniscus lens L13 having convex surface facing the object.

The second lens group G2 is composed of, in order from the object, a positive meniscus lens L21 having a convex surface facing the object, a double concave negative lens L22, a cemented lens constructed by a double concave negative lens L23 cemented with a double convex positive lens L24, and a double convex positive lens L25.

The third lens group G3 is composed of a positive meniscus lens L31 having a convex surface facing the object.

The second lens group G2 is movable to the object along an optical axis for varying focusing from an object locating at infinity to an object locating at a close distance.

Various values associated with the optical system according to Example 5 are listed in Table 5.

TABLE 5

[Specifications]

| | |
|---|---|
| f = | 85.1452 |
| FNO = | 1.44 |
| 2ω = | 28.39 |
| Y = | 21.60 |
| TL = | 120.98 |
| Bf = | 38.12 |

[Lens Data]

| i | r | d | nd | vd |
|---|---|---|---|---|
| 1 | 48.8417 | 11.20 | 1.60300 | 65.47 |
| 2 | 448.8233 | 0.10 | | |
| 3 | 44.0159 | 7.60 | 1.80400 | 46.58 |
| 4 | 67.5908 | 4.64 | | |
| 5 | 204.7044 | 2.30 | 1.67270 | 32.11 |
| 6 | 28.5061 | 10.70 | | |
| 7 | ∞ | (d7) | Aperture Stop S | |
| 8 | 52.1712 | 3.60 | 1.77250 | 49.61 |
| 9 | 14443.5010 | 3.30 | | |
| 10 | −49.7521 | 1.50 | 1.58144 | 40.75 |
| 11 | 48.8814 | 6.00 | | |
| 12 | −43.0322 | 1.40 | 1.58144 | 40.75 |
| 13 | 62.8163 | 7.30 | 1.77250 | 49.61 |
| 14 | −41.0534 | 0.10 | | |
| 15 | 100.8291 | 3.40 | 1.69680 | 55.52 |
| 16 | −187.3176 | (d16) | | |
| 17 | 329.9899 | 2.00 | 1.77250 | 49.61 |
| 18 | 780.7371 | Bf | | |

[Lens Group Data]

| Group | i | focal length |
|---|---|---|
| G1 | 1 | 219.1428 |
| G2 | 8 | 71.9802 |
| G3 | 17 | 715.7011 |

[Variable Distances]

| | Infinity | Close Distance |
|---|---|---|
| β = | 0.0000 | −0.11598 |
| d0 = | ∞ | 731.5216 |
| d7 = | 14.91346 | 2.53213 |
| d16 = | 3.60003 | 15.98136 |
| Bf = | 38.12 | 38.12 |

TABLE 5-continued

[Values for Conditional Expressions]

| | L22 | L23 |
|---|---|---|
| (4): vdA = | 40.75, | 40.75 |
| (5): 0.00913 × vdA + ndA = | 1.95349, | 1.95349 |
| (6): ndA = | 1.58144, | 1.58144 |

| | L21 | L24 | L25 |
|---|---|---|---|
| (7): ndB = | 1.77250, | 1.77250, | 1.69680 |
| (8): 0.00667 × vdB + ndB = | 2.10340, | 2.10340, | 2.06712 |

FIGS. 2A, and 2B are graphs showing various aberrations of the optical system according to Example 5 of the second embodiment, in which FIG. 2A shows upon focusing on an object locating at infinity, and FIG. 2B shows upon focusing on an object locating at a close distance (β=−0.11598). Here, the image height is Y=21.60.

As is apparent from the respective graphs, the optical system according to Example 1 shows superb optical performance as a result of good corrections to various aberrations.

EXAMPLE 6

FIG. 3 is a sectional view showing a lens configuration of an optical system according to Example 6 of the second embodiment.

The optical system according to Example 6 is composed of, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having convex surface facing the object, a positive meniscus lens L12 having convex surface facing the object, and a negative meniscus lens L13 having convex surface facing the object.

The second lens group G2 is composed of, in order from the object, a positive meniscus lens L21 having a convex surface facing the object, a double concave negative lens L22, a cemented lens constructed by a double concave negative lens L23 cemented with a double convex positive lens L24, and a double convex positive lens L25.

The third lens group G3 is composed of a positive meniscus lens L31 having a convex surface facing the object.

The second lens group G2 is movable to the object along an optical axis for varying focusing from an object locating at infinity to an object locating at a close distance.

Various values associated with the optical system according to Example 6 are listed in Table 6.

TABLE 6

[Specifications]

| | |
|---|---|
| f = | 85.0 |
| FNO = | 1.44 |
| 2ω = | 28.75 |
| Y = | 21.60 |
| TL = | 120.76 |
| Bf = | 38.12 |

TABLE 6-continued

[Lens Data]

| i | r | d | nd | vd |
|---|---|---|---|---|
| 1 | 49.6722 | 11.20 | 1.60300 | 65.47 |
| 2 | 357.8769 | 0.10 | | |
| 3 | 43.3361 | 7.60 | 1.80400 | 46.58 |
| 4 | 66.3322 | 4.42 | | |
| 5 | 161.8658 | 2.30 | 1.67270 | 32.11 |
| 6 | 28.5061 | 10.70 | | |
| 7 | ∞ | (d7) | Aperture Stop S | |
| 8 | 51.3573 | 3.60 | 1.80400 | 46.58 |
| 9 | 2180.315 | 3.30 | | |
| 10 | −52.2845 | 1.50 | 1.60342 | 38.00 |
| 11 | 48.3972 | 6.00 | | |
| 12 | −43.1588 | 1.40 | 1.60342 | 38.00 |
| 13 | 62.8163 | 7.30 | 1.80400 | 46.58 |
| 14 | −41.997 | 0.10 | | |
| 15 | 105.218 | 3.40 | 1.69680 | 55.52 |
| 16 | −187.318 | (d16) | | |
| 17 | 306.5836 | 2.00 | 1.77250 | 49.61 |
| 18 | 819.5894 | Bf | | |

[Lens Group Data]

| Group | i | focal length |
|---|---|---|
| G1 | 1 | 218.15933 |
| G2 | 8 | 73.20767 |
| G3 | 17 | 616.32650 |

[Variable Distances]

| | Infinity | Close Distance |
|---|---|---|
| β = | 0.00000 | −0.11475 |
| d0 = | ∞ | 731.5216 |
| d7 = | 14.91346 | 2.53213 |
| d16 = | 2.29346 | 14.67479 |
| Bf = | 38.12 | 38.12 |

[Values for Conditional Expressions]

| | L22 | L23 |
|---|---|---|
| (4): vdA = | 38.00, | 38.00 |
| (5): 0.00913 × vdA + ndA = | 1.95036, | 1.95036 |
| (6): ndA = | 1.60342, | 1.60342 |

| | L21 | L24 | L25 |
|---|---|---|---|
| (7): ndB = | 1.80400, | 1.80400, | 1.69680 |
| (8): 0.00667 × vdB + ndB = | 2.11469, | 2.11469, | 2.06712 |

FIGS. 4A, and 4B are graphs showing various aberrations of the optical system according to Example 6 of the second embodiment, in which FIG. 4A shows upon focusing on an object locating at infinity, and FIG. 4B shows upon focusing on an object locating at a close distance (β=−0.11475). Here, the image height is Y=21.60.

As is apparent from the respective graphs, the optical system according to Example 6 shows superb optical performance as a result of good corrections to various aberrations.

EXAMPLE 7

FIG. 5 is a sectional view showing a lens configuration of an optical system according to Example 7 of the second embodiment.

The optical system according to Example 7 is composed of, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having convex surface facing the object, a positive meniscus lens L12 having convex surface facing the object, and a negative meniscus lens L13 having convex surface facing the object.

The second lens group G2 is composed of, in order from the object, a positive meniscus lens L21 having a convex surface facing the object, a double concave negative lens L22, a cemented lens constructed by a negative meniscus lens L23 having a concave surface facing the object cemented with a positive meniscus lens L24 having a convex surface facing the image plane I, and a double convex positive lens L25.

The third lens group G3 is composed of a positive meniscus lens L31 having a convex surface facing the object.

The second lens group G2 is movable to the object along an optical axis for varying focusing from an object locating at infinity to an object locating at a close distance.

Various values associated with the optical system according to Example 7 are listed in Table 7.

TABLE 7

[Specifications]

| | |
|---|---|
| f = | 86.0 |
| FNO = | 1.44 |
| 2ω = | 28.38 |
| Y = | 21.60 |
| TL = | 120.87 |
| Bf = | 38.12 |

[Lens Data]

| i | r | d | nd | vd |
|---|---|---|---|---|
| 1 | 48.8417 | 11.20 | 1.60300 | 65.47 |
| 2 | 448.8233 | 0.10 | | |
| 3 | 44.0159 | 7.60 | 1.80400 | 46.58 |
| 4 | 67.5908 | 4.64 | | |
| 5 | 204.7044 | 2.30 | 1.67270 | 32.11 |
| 6 | 28.5061 | 10.70 | | |
| 7 | ∞ | (d7) | Aperture Stop S | |
| 8 | 44.3052 | 4.20 | 1.83481 | 42.72 |
| 9 | 701.4073 | 2.50 | | |
| 10 | −84.1675 | 1.50 | 1.62004 | 36.30 |
| 11 | 40.6158 | 7.00 | | |
| 12 | −34.0106 | 1.50 | 1.67270 | 32.11 |
| 13 | −156.805 | 7.60 | 1.83481 | 42.72 |
| 14 | −43.4693 | 0.10 | | |
| 15 | 97.7847 | 3.60 | 1.69680 | 55.52 |
| 16 | −81.5801 | (d16) | | |
| 17 | 329.9899 | 2.00 | 1.77250 | 49.61 |
| 18 | 780.7371 | Bf | | |

[Lens Group Data]

| Group | i | focal length |
|---|---|---|
| G1 | 1 | 219.14277 |
| G2 | 8 | 71.98016 |
| G3 | 17 | 715.70110 |

[Variable Distances]

| | Infinity | Close Distance |
|---|---|---|
| β = | 0.0000 | −0.11579 |
| d0 = | ∞ | 731.5216 |
| d7 = | 13.60145 | 1.22012 |
| d16 = | 2.09728 | 14.47861 |
| Bf = | 38.12 | 38.12 |

TABLE 7-continued

[Values for Conditional Expressions]

|  | L22 | L23 |
|---|---|---|
| (4): vdA = | 36.30, | 33.79 |
| (5): 0.00913 × vdA + ndA = | 1.95146, | 1.95146 |
| (6): ndA = | 1.62004, | 1.64769 |

|  | L21 | L24 | L25 |
|---|---|---|---|
| (7): ndB = | 1.83481, | 1.83481, | 1.69680 |
| (8): 0.00667 × vdB + ndB = | 2.11975, | 2.11975, | 2.06712 |

FIGS. 6A, and 6B are graphs showing various aberrations of the optical system according to Example 7 of the second embodiment, in which FIG. 6A shows upon focusing on an object locating at infinity, and FIG. 6B shows upon focusing on an object locating at a close distance ($\beta=-0.11579$). Here, the image height is Y=21.60.

As is apparent from the respective graphs, the optical system according to Example 7 shows superb optical performance as a result of good corrections to various aberrations.

EXAMPLE 8

FIG. 7 is a sectional view showing a lens configuration of an optical system according to Example 8 of the second embodiment.

The optical system according to Example 8 is composed of, in order from an object, a first lens group G1 having positive refractive power, and a second lens group G2 having positive refractive power.

An aperture stop S is disposed between the first lens group G1 and the second lens group G2.

The first lens group G1 is composed of, in order from the object, a positive meniscus lens L11 having convex surface facing the object, a positive meniscus lens L12 having convex surface facing the object, and a negative meniscus lens L13 having convex surface facing the object.

The second lens group G2 is composed of, in order from the object, a double convex positive lens L21, a double concave negative lens L22, a cemented lens constructed by a double concave negative lens L23 cemented with a double convex positive lens L24, a double convex positive lens L25, and a negative meniscus lens L26 having a concave surface facing the object.

The second lens group G2 is movable to the object along an optical axis for varying focusing from an object locating at infinity to an object locating at a close distance.

Various values associated with the optical system according to Example 8 are listed in Table 8.

TABLE 8

[Specifications]

| f = | 86.1 |
|---|---|
| FNO = | 1.45 |
| 2ω = | 28.40 |
| Y = | 21.60 |
| TL = | 120.20 |

[Lens Data]

| i | r | d | nd | vd |
|---|---|---|---|---|
| 1 | 47.1005 | 11.20 | 1.60300 | 65.47 |
| 2 | 389.6297 | 0.10 |  |  |
| 3 | 43.2050 | 7.60 | 1.80400 | 46.58 |
| 4 | 64.2685 | 4.23 |  |  |
| 5 | 193.6555 | 2.30 | 1.67270 | 32.11 |
| 6 | 28.1335 | 10.70 |  |  |
| 7 | ∞ | (d7) | Aperture Stop S | |
| 8 | 51.1641 | 3.60 | 1.77250 | 49.61 |
| 9 | −1655.5923 | 3.30 |  |  |
| 10 | −46.1050 | 1.50 | 1.58144 | 40.75 |
| 11 | 49.8060 | 6.00 |  |  |
| 12 | −44.6366 | 1.40 | 1.58144 | 40.75 |
| 13 | 62.8163 | 7.30 | 1.77250 | 49.61 |
| 14 | −38.9308 | 0.10 |  |  |
| 15 | 93.9046 | 3.40 | 1.69680 | 55.52 |
| 16 | −187.3176 | 2.29 |  |  |
| 17 | −57.0412 | 2.00 | 1.77250 | 49.61 |
| 18 | −59.6536 | (d18) |  |  |

[Lens Group Data]

| Group | i | focal length |
|---|---|---|
| G1 | 1 | 219.14277 |
| G2 | 8 | 65.48955 |

[Variable Distances]

|  | Infinity | Close Distance |
|---|---|---|
| β = | 0.00000 | −0.11454 |
| d0 = | ∞ | 731.5216 |
| d7 = | 15.10219 | 4.28681 |
| d18 (Bf) = | 38.08 | 48.89 |

[Values for Conditional Expressions]

|  | L22 | L23 |
|---|---|---|
| (4): vdA = | 40.75, | 40.75 |
| (5): 0.00913 × vdA + ndA = | 1.95349, | 1.95349 |
| (6): ndA = | 1.58144, | 1.58144 |

|  | L21 | L24 | L25 |
|---|---|---|---|
| (7): ndB = | 1.77250, | 1.77250, | 1.69680 |
| (8): 0.00667 × vdB + ndB = | 2.10340, | 2.10340, | 2.06712 |

FIGS. 8A, and 8B are graphs showing various aberrations of the optical system according to Example 8 of the second embodiment, in which FIG. 8A shows upon focusing on an object locating at infinity, and FIG. 8B shows upon focusing on an object locating at a close distance ($\beta=-0.11454$).

As is apparent from the respective graphs, the optical system according to Example 8 shows superb optical performance as a result of good corrections to various aberrations.

EXAMPLE 9

Figure 9:
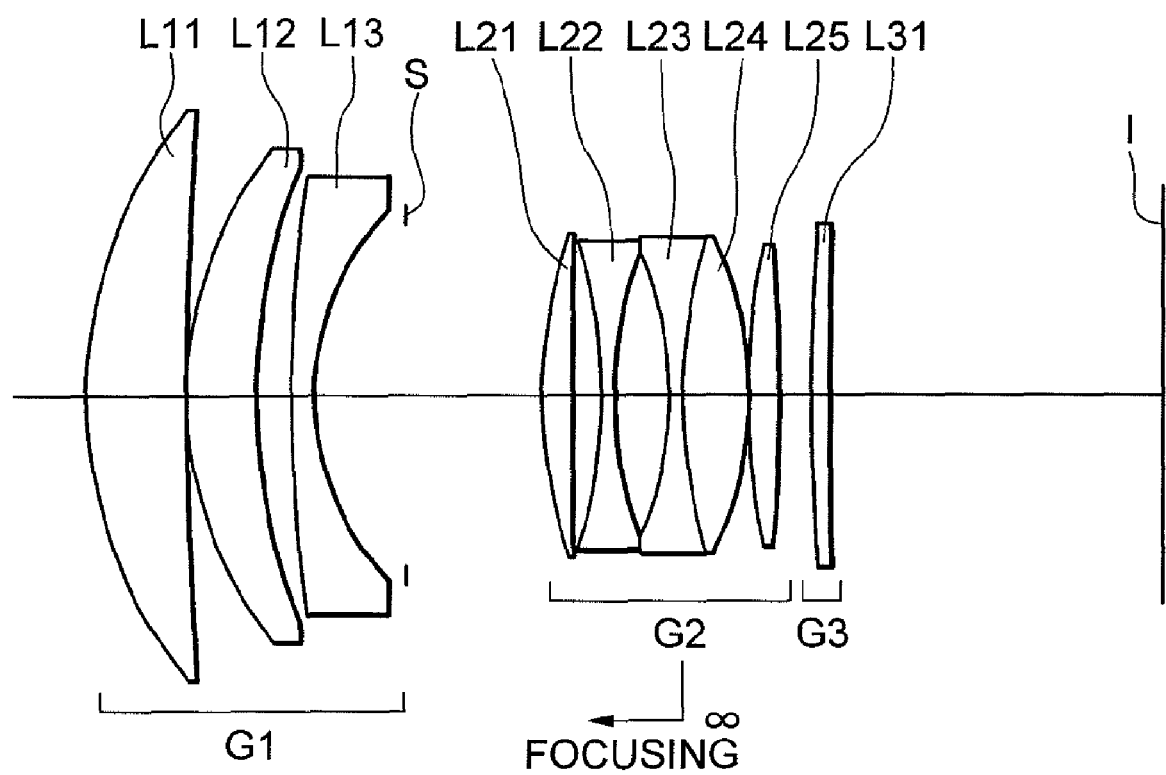
FIG. 9 is a sectional view showing a lens configuration of an optical system according to Example 9 of the second embodiment.

FIG. 9 is a sectional view showing a lens configuration of an optical system according to Example 9 of the second embodiment.

The optical system according to Example 9 is composed of, in order from an object, a first lens group G1 having positive refractive power, a second lens group G2 having positive refractive power, and a third lens group G3 having positive refractive power.

An aperture stop S is disposed between the first lens group G1 and the second lens group G2.

The first lens group G1 is composed of, in order from the object, a positive meniscus lens L11 having convex surface facing the object, a positive meniscus lens L12 having convex surface facing the object, and a negative meniscus lens L13 having convex surface facing the object.

The second lens group G2 is composed of, in order from the object, a double convex positive lens L21, a double concave negative lens L22, a cemented lens constructed by a double concave negative lens L23 cemented with a double convex positive lens L24, and a double convex positive lens L25.

The third lens group G3 is composed of a positive meniscus lens L31 having a convex surface facing the object.

The second lens group G2 is movable to the object along an optical axis for varying focusing from an object locating at infinity to an object locating at a close distance.

Various values associated with the optical system according to Example 9 are listed in Table 9.

TABLE 9

[Specifications]

| | |
|---|---|
| f = | 85.0 |
| FNO = | 1.45 |
| 2ω = | 28.76 |
| Y = | 21.60 |
| TL = | 120.69 |
| Bf = | 38.12 |

[Lens Data]

| i | r | d | nd | νd |
|---|---|---|---|---|
| 1 | 49.1219 | 11.20 | 1.60300 | 65.47 |
| 2 | 383.8573 | 0.10 | | |
| 3 | 43.0298 | 7.60 | 1.80400 | 46.58 |
| 4 | 65.1701 | 4.19 | | |
| 5 | 168.3702 | 2.30 | 1.67270 | 32.11 |
| 6 | 28.3841 | 10.70 | | |
| 7 | ∞ | (d7) | Aperture Stop S | |
| 8 | 51.6258 | 3.60 | 1.79500 | 45.30 |
| 9 | −11753.4240 | 3.30 | | |
| 10 | −52.1126 | 1.50 | 1.60342 | 38.00 |
| 11 | 49.5651 | 6.00 | | |
| 12 | −41.8483 | 1.40 | 1.64769 | 33.79 |
| 13 | 62.8163 | 7.30 | 1.80610 | 40.94 |
| 14 | −40.3613 | 0.10 | | |
| 15 | 92.9455 | 3.40 | 1.65160 | 58.54 |
| 16 | −164.6403 | (d16) | | |
| 17 | 306.5836 | 2.00 | 1.77250 | 49.61 |
| 18 | 819.5894 | Bf | | |

[Lens Group Data]

| Group | i | focal length |
|---|---|---|
| G1 | 1 | 218.15933 |
| G2 | 8 | 73.20767 |
| G3 | 17 | 616.32350 |

[Variable Distances]

| | Infinity | Close Distance |
|---|---|---|
| β = | 0.00000 | −0.11475 |
| d0 = | ∞ | 731.5216 |
| d7 = | 14.76993 | 2.38860 |
| d16 = | 2.60043 | 14.98176 |
| Bf = | 38.12 | 38.12 |

[Values for Conditional Expressions]

| | L22 | L23 |
|---|---|---|
| (4): νdA = | 38.00, | 33.79 |
| (5): 0.00913 × νdA + ndA = | 1.95036, | 1.95036 |
| (6): ndA = | 1.60342, | 1.64769 |

| | L21 | L24 | L25 |
|---|---|---|---|
| (7): ndB = | 1.79500, | 1.80610, | 1.65160 |
| (8): 0.00667 × νdB + ndB = | 2.09715, | 2.07917, | 2.04206 |

Figure 10A:
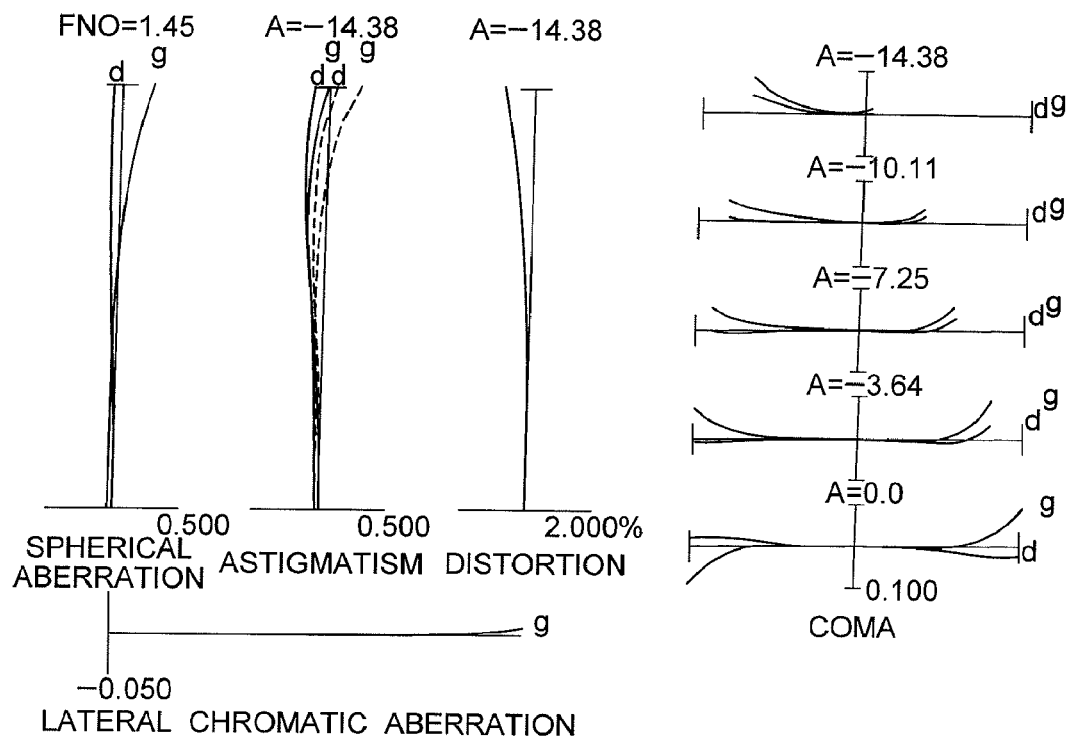
Figure 10B:
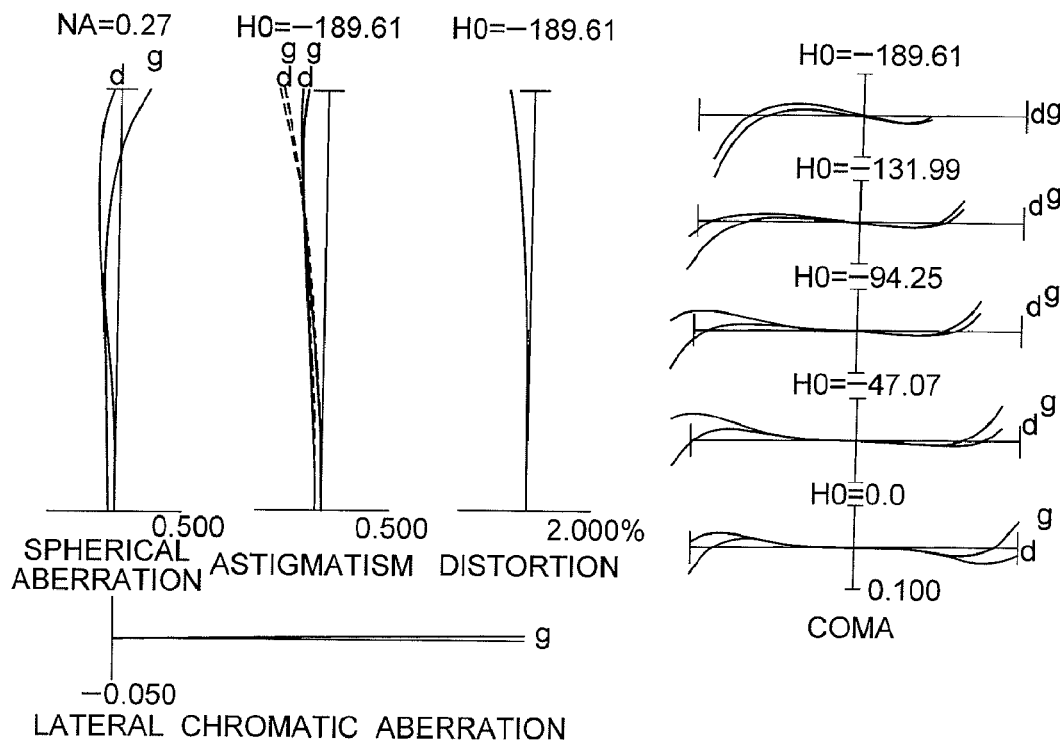

FIGS. 10A, and 10B are graphs showing various aberrations of the optical system according to Example 9 of the second embodiment, in which FIG. 10A shows upon focusing on an object locating at infinity, and FIG. 10B shows upon focusing on an object locating at a close distance (β=−0.11475). Here, the image height is Y=21.60.

As is apparent from the respective graphs, the optical system according to Example 9 shows superb optical performance as a result of good corrections to various aberrations.

As described above, the second embodiment makes it possible to provide an optical system having excellent optical performance with sufficiently correcting variation in spherical aberration and curvature of field, having high focusing accuracy capable of performing quick focusing by the second lens group being a light-weight focusing lens group despite of a large aperture ratio.

An outline of a method for manufacturing the optical system according to the second embodiment including, in order from an object, a first lens group G1 having positive refractive power, and a second lens group G2 having positive refractive power is explained below with reference to FIG. 13.

Figure 13:
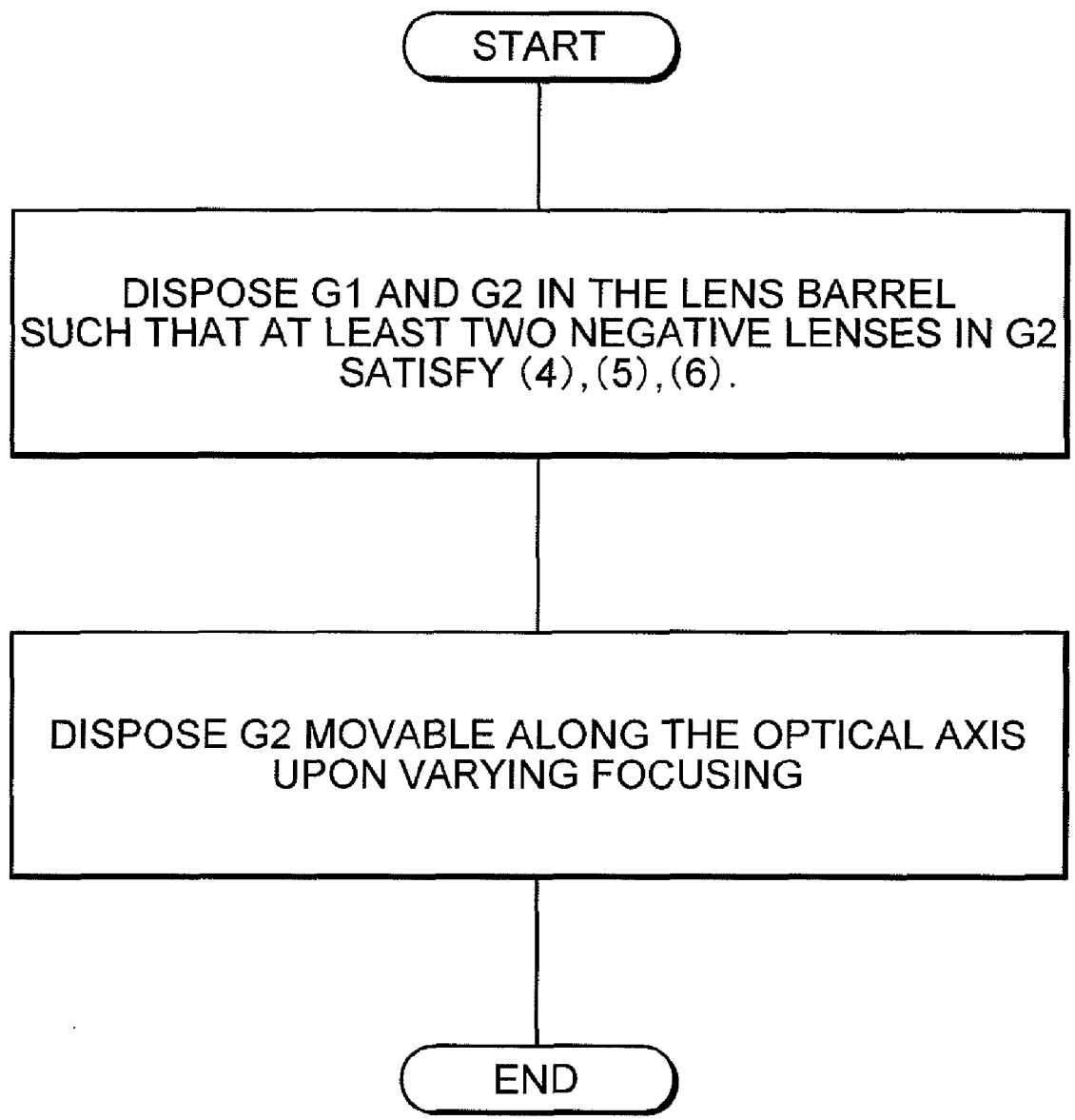
FIG. 13 is a flowchart showing a procedure of a method for manufacturing the optical system according to the second embodiment.

FIG. 13 is a flowchart showing a procedure of a method for manufacturing the optical system according to the second embodiment.

At first, each lens of the first lens group G1, and the second lens group G2 is disposed in a lens barrel having cylindrical shape such that at least two negative lenses in the second lens group G2 satisfy the following conditional expressions (4), (5) and (6):

$$\nu dA < 50 \tag{4}$$

$$0.00913 \times \nu dA + ndA < 2.16043 \tag{5}$$

$$ndA < 1.66000 \tag{6}$$

where νdA denotes an Abbe number of the negative lens in the second lens group at d-line in which the wavelength λ=587.6 nm, and ndA denotes a refractive index of the negative lens in the second lens group at d-line in which the wavelength λ=587.6 nm. Then, the second lens group G2 is disposed movable along the optical axis upon varying focusing.

Then, a camera equipped with the optical system according to Example 1 of the first embodiment is explained below. Although a case where the internal-focusing type optical system according to Example 1 is installed into a camera is explained, the same result can be obtained by any other Examples in the first and second embodiments.

Figure 11:
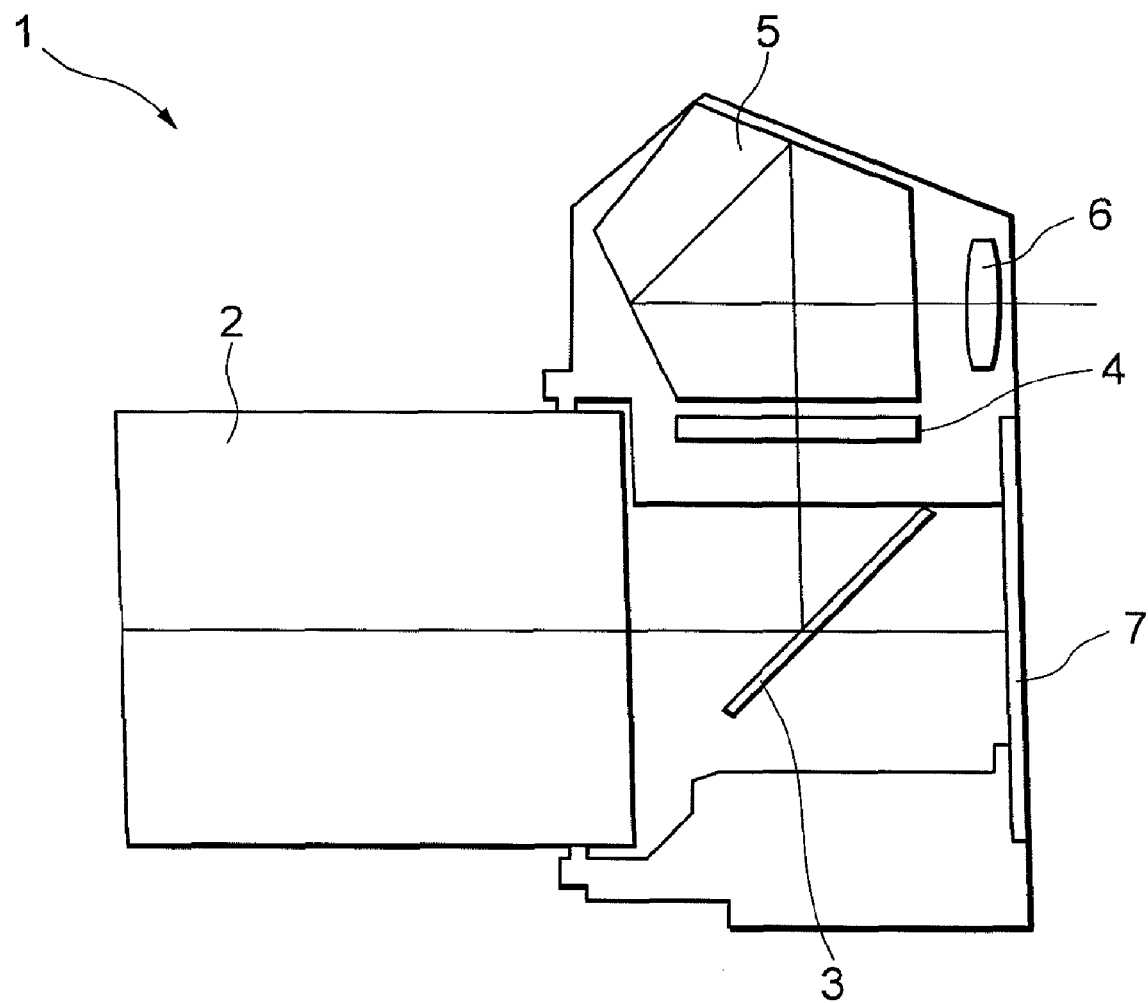
FIG. 11 is a diagram showing a camera equipped with the optical system according to Example 1 of the first embodiment.

FIG. 11 is a schematic diagram showing a camera equipped with the wide-angle lens according to Example 1.

As shown in FIG. 11, the camera 1 is a single-lens reflex digital camera equipped with the optical system according to Example 1 as an image-taking lens 2. In the camera 1, light emitted from an object (not shown) is converged by an image-taking lens 2, and focused on a focusing screen 4 through a quick return mirror 3. The light focused on the focusing screen 4 is reflected a plurality of times by a pentagonal roof prism 5, and led to an eyepiece 6. Accordingly, a photographer can observe the object image as an erected image through the eyepiece 6.

When the photographer presses a shutter release button (not shown), the quick return mirror 3 is retracted from an optical path, and the light from the object (not shown) reaches an imaging device 7. Accordingly, light from the object forming the object image is captured by the imaging device 7 and stored in a memory (not shown) as an object image. In this manner, the photographer can take a picture of the object by the camera 1.

With installing the internal-focusing type optical system according to Example 1 into the camera 1 as an image-taking lens 2, it becomes possible to realize a camera having high optical performance.

Incidentally, the following description may suitably be applied within limits that do not deteriorate optical performance.

Although a two-lens-group configuration or a three-lens-group configuration is shown in each Example of the present embodiment, the present embodiment can be applied to other lens-group configurations such as a four-lens-group configuration, and a five-lens-group configuration.

In each Example, in order to vary focusing from infinity to a close distance, a portion of a lens group, a single lens group, or a plurality of lens groups may be moved along the optical axis.

The focusing lens group(s) may be used for auto focus, and suitable for being driven by a motor such as an ultrasonic motor. It is preferable that the second lens group is used as the focusing lens group.

A lens group or a portion of a lens group may be shifted in a direction perpendicular to the optical axis as a vibration reduction lens group for correcting an image blur caused by a camera shake. It is particularly preferable that at least a portion of the second lens group or the third lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed between the first lens group and the second lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

An optical system according to the present application may be used as a zoom lens system by varying the distances between the first lens group, the second lens group, and the third lens group.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. An optical system comprising, in order from an object:
   a first lens group having positive refractive power; and
   a second lens group having positive refractive power;
   the second lens group weighing as the first lens group or less and being movable along an optical axis for varying focusing, and
   the first lens group satisfying the following conditional expression:

$$2.50 < f1/f$$

where f1 denotes a focal length of the first lens group, and f denotes a focal length of the optical system.

2. The optical system according to claim 1, wherein the first lens group and the second lens group satisfy the following conditional expression:

$$2.60 < f1/f2$$

where f2 denotes a focal length of the second lens group.

3. The optical system according to claim 1, wherein the following conditional expression is satisfied:

$$0.7 < f2/f < 1.2$$

where f2 denotes a focal length of the second lens group.

4. The optical system according to claim 1, wherein an aperture stop is disposed between the first lens group and the second lens group.

5. The optical system according to claim 1, wherein the first lens group is fixed along an optical axis upon varying focusing.

6. The optical system according to claim 1, wherein the second lens group includes a cemented lens.

7. The optical system according to claim 1, wherein each lens surface of the optical system is a spherical surface or a plane surface.

8. An imaging apparatus equipped with the optical system according to claim 1.

9. An optical system comprising, in order from an object:
   a first lens group having positive refractive power;
   a second lens group having positive refractive power; and
   a third lens group having positive refractive power;
   the second lens group being movable along an optical axis for varying focusing, and
   the first lens group satisfying the following conditional expression:

$$2.50 < f1/f$$

where f1 denotes a focal length of the first lens group, and f denotes a focal length of the optical system.

10. The optical system according to claim 9, wherein the first lens group and the second lens group satisfy the following conditional expression:

$$2.75 < f1/f2$$

where f2 denotes a focal length of the second lens group.

11. The optical system according to claim 9, wherein the second lens group satisfies the following conditional expression:

$$0.7 < f2/f < 1.2$$

where f2 denotes a focal length of the second lens group.

12. The optical system according to claim 9, wherein an aperture stop is disposed between the first lens group and the second lens group.

13. The optical system according to claim 9, wherein the first lens group is fixed along an optical axis upon varying focusing.

14. The optical system according to claim 9, wherein the second lens group includes a cemented lens.

15. The optical system according to claim 9, wherein each lens surface of the optical system is a spherical surface or a plane surface.

16. The optical system according to claim 9, wherein the second lens group weighs as the first lens group or less.

17. An imaging apparatus equipped with the optical system according to claim 9.

18. An optical system comprising, in order from an object:
    a first lens group having positive refractive power;
    a second lens group having positive refractive power; and
    a third lens group having positive refractive power;

the second lens group being movable along an optical axis for varying focusing, and the first lens group satisfying the following conditional expression:

$$2.2 < f1/f < 2.8$$

where f1 denotes a focal length of the first lens group, and f denotes a focal length of the optical system.

19. An optical system having only two lens groups, the two lens groups being, in order from an object:
a first lens group having positive refractive power; and
a second lens group having positive refractive power;
the second lens group being movable along an optical axis for varying focusing, and
at least two negative lenses in the second lens group satisfying the following conditional expressions:

$$vdA < 50$$

$$0.00913 \times vdA + ndA < 2.16043$$

$$ndA < 1.66000$$

where vdA denotes an Abbe number of each of the negative lenses at d-line in which a wavelength λ=587.6 nm, and ndA denotes a refractive index of each of the negative lenses at d-line in which the wavelength λ=587.6 nm.

20. The optical system according to claim 19, wherein at least one positive lens in the second lens group satisfies the following conditional expressions:

$$1.64000 < ndB < 1.86000$$

$$1.88333 < 0.00667 \times vdB + ndB$$

where vdB denotes an Abbe number of the positive lens at d-line in which a wavelength λ=587.6 nm, and ndB denotes a refractive index of the positive lens at d-line in which a wavelength λ=587.6 nm.

21. An imaging apparatus equipped with the optical system according to claim 19.

22. A method for manufacturing an optical system that includes, in order from an object, a first lens group having positive refractive power and a second lens group having positive refractive power, the method comprising steps of:
disposing each lens of the first lens group and the second lens group so as to satisfy the following conditional expression:

$$2.50 < f1/f$$

where f1 denotes a focal length of the first lens group and f denotes a focal length of the optical system; and
disposing the second lens group so as to be movable along the optical axis upon varying focusing, and
wherein the second lens group weighs as the first lens group or less.

23. The method according to claim 22, further comprising a step of:
disposing the first lens group and the second lens group so as to satisfy the following conditional expression:

$$2.60 < f1/f2$$

where f2 denotes a focal length of the second lens group.

24. The method according to claim 22, further comprising a step of:
satisfying the following conditional expression:

$$0.7 < f2/f < 1.2$$

where f2 denotes a focal length of the second lens group.

25. The method according to claim 22, further comprising a step of:
disposing a third lens group having positive refractive power disposed to an image side of the second lens group.

26. A method for manufacturing an optical system that has only two lens groups, the two lens groups being, in order from an object, a first lens group having positive refractive power and a second lens group having positive refractive power, the method comprising steps of:
disposing at least two negative lenses in the second lens group satisfying the following conditional expressions:

$$vdA < 50$$

$$0.00913 \times vdA + ndA < 2.16043$$

$$ndA < 1.66000$$

where vdA denotes an Abbe number of each of the negative lenses at d-line in which a wavelength λ=587.6nm, and ndA denotes a refractive index of each of the negative lenses at d-line in which the wavelength λ=587.6nm; and
disposing the second lens group so as to be movable along an optical axis upon varying focusing.

27. The method according to claim 26, further comprising a step of:
disposing at least one positive lens in the second lens group satisfying the following conditional expressions:

$$1.64000 < ndB < 1.86000$$

$$1.88333 < 0.00667 \times vdB + ndB$$

where vdB denotes an Abbe number of the positive lens at d-line in which a wavelength λ=587.6nm, and ndB denotes a refractive index of the positive lens at d-line in which a wavelength λ=587.6nm.

28. A method for manufacturing an optical system that includes, in order from an object, a first lens group having positive refractive power, a second lens group having positive refractive power, and a third lens group having positive refractive power, the method comprising steps of:
disposing each lens of the first lens group and the second lens group so as to satisfy the following conditional expression:

$$2.50 < f1/f$$

where f1 denotes a focal length of the first lens group and f denotes a focal length of the optical system; and
disposing the second lens group so as to be movable along the optical axis upon varying focusing.

29. The method according to claim 28, further comprising a step of:
disposing the first lens group and the second lens group so as to satisfy the following conditional expression:

$$2.60 < f1/f2$$

where f2 denotes a focal length of the second lens group.

30. The method according to claim 28, further comprising a step of:
satisfying the following conditional expression:

$$0.7 < f2/f < 1.2$$

where f2 denotes a focal length of the second lens group.

* * * * *